US 8,922,490 B2

(12) United States Patent
Davidson et al.

(10) Patent No.: US 8,922,490 B2
(45) Date of Patent: Dec. 30, 2014

(54) DEVICE, METHOD, AND GRAPHICAL USER INTERFACE FOR ENTERING ALTERNATE CHARACTERS WITH A PHYSICAL KEYBOARD

(75) Inventors: Douglas R. Davidson, Palo Alto, CA (US); Michael B. Victor, Castro Valley, CA (US); John Harvey, III, Philadelphia, PA (US); Michael S. Grady, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 615 days.

(21) Appl. No.: 13/243,733

(22) Filed: Sep. 23, 2011

(65) Prior Publication Data

US 2012/0306747 A1 Dec. 6, 2012

Related U.S. Application Data

(60) Provisional application No. 61/493,351, filed on Jun. 3, 2011.

(51) Int. Cl.
G06F 3/02 (2006.01)
G06F 3/0489 (2013.01)

(52) U.S. Cl.
CPC ................................. G06F 3/04895 (2013.01)
USPC .......................................................... 345/168

(58) Field of Classification Search
CPC ... G06F 3/0233; G06F 3/0234; G06F 3/0235; G06F 3/0236; G06F 3/0237; G06F 3/04895
USPC .................................................. 345/168–172
See application file for complete search history.

(56) References Cited

U.S. PATENT DOCUMENTS

| 5,952,942 | A  * | 9/1999 | Balakrishnan et al. | 341/20 |
| 7,075,520 | B2 * | 7/2006 | Williams | 345/169 |
| 7,167,731 | B2 * | 1/2007 | Nelson | 455/566 |
| 7,603,142 | B1 * | 10/2009 | Toebes et al. | 455/566 |
| 8,018,441 | B2 * | 9/2011 | Shin et al. | 345/173 |
| 8,078,231 | B2 * | 12/2011 | Toebes et al. | 455/566 |
| 8,253,690 | B2 * | 8/2012 | Wang et al. | 345/168 |
| 8,311,588 | B2 * | 11/2012 | Toebes et al. | 455/566 |
| 8,531,403 | B2 * | 9/2013 | Perera | 345/168 |
| 8,666,457 | B2 * | 3/2014 | Toebes et al. | 455/566 |
| 8,692,766 | B2 * | 4/2014 | Ladouceur | 345/156 |
| 2003/0107555 | A1 * | 6/2003 | Williams | 345/169 |
| 2005/0116927 | A1 * | 6/2005 | Voelckers | 345/157 |
| 2007/0013650 | A1 * | 1/2007 | Ladouceur | 345/156 |

(Continued)

*Primary Examiner* — Dmitriy Bolotin
(74) *Attorney, Agent, or Firm* — Brownstein Hyatt Farber Schreck, LLP

(57) ABSTRACT

A device displays a text entry area with an insertion point and detects activation of a first physical key in a physical keyboard. In response to a determination that the activation of the first physical key lasts more than a first predefined time period, the device displays a character selection area; while displaying the character selection area, the device detects activation of a second physical key in the physical keyboard; in response to a determination that the activated second physical key is an arrow key, the device moves a current character focus in accordance with a direction of the arrow key; and, in response to a determination that the activated second physical key is the first physical key, the device enters in the text entry area a single instance of a character that has the current character focus, and ceases to display the character selection area.

20 Claims, 23 Drawing Sheets

(56) References Cited

U.S. PATENT DOCUMENTS

| | | |
|---|---|---|
| 2008/0062136 A1* | 3/2008 | Nakamura et al. ............ 345/171 |
| 2009/0179860 A1* | 7/2009 | Wang et al. .................. 345/168 |
| 2009/0267900 A1* | 10/2009 | Chen et al. ................... 345/168 |
| 2009/0319943 A1* | 12/2009 | Ha ................................ 715/802 |
| 2010/0149101 A1* | 6/2010 | Guo et al. ..................... 345/168 |
| 2011/0095986 A1* | 4/2011 | Aono et al. ................... 345/168 |
| 2012/0206357 A1* | 8/2012 | Vandeputte ................... 345/163 |
| 2012/0206366 A1* | 8/2012 | Vandeputte ................... 345/169 |

* cited by examiner

DEVICE, METHOD, AND GRAPHICAL USER INTERFACE FOR ENTERING ALTERNATE CHARACTERS WITH A PHYSICAL KEYBOARD

RELATED APPLICATION

This claims priority to U.S. Provisional Application Ser. No. 61/493,351, filed Jun. 3, 2011, entitled "Device, Method, and Graphical User Interface for Entering Alternate Characters with a Physical Keyboard," which is incorporation herein by reference in its entirety.

TECHNICAL FIELD

This relates generally to electronic devices with physical keyboards, including but not limited to electronic devices with physical keyboards that input alternate characters from the characters shown on the physical keys.

BACKGROUND

Text entry is a common activity on computers and other electronics devices. Whether it be composing a document, entering identifying information, or typing a message, text entry is an inescapable part of a user's computing experience. For text input via a physical keyboard (as opposed to a soft or virtual keyboard), the physical keyboard is limited to showing a default set of characters on the physical keys for text input. Various methods have been developed to allow physical keyboards to enter alternate characters rather than the default characters shown on the physical keys.

But existing methods for entering alternate characters via physical keyboards are cumbersome and inefficient. For example, entering alternate characters that include diacritical marks is tedious and creates a significant cognitive burden on a user. In addition, existing methods take longer than necessary, thereby wasting energy. This latter consideration is particularly important in battery-operated devices.

SUMMARY

Accordingly, there is a need for electronic devices with faster, more efficient methods and interfaces for entering alternate characters using a physical keyboard. Such methods and interfaces may complement or replace conventional methods for entering alternate characters. Such methods and interfaces reduce the cognitive burden on a user and produce a more efficient human-machine interface. For battery-operated devices, such methods and interfaces conserve power and increase the time between battery charges.

The above deficiencies and other problems associated with electronic devices with physical keyboards are reduced or eliminated by the disclosed devices. In some embodiments, the device is a desktop computer. In some embodiments, the device is portable (e.g., a notebook computer, tablet computer, or handheld device). In some embodiments, the device also has a touchpad. In some embodiments, the device also has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a non-transitory computer readable storage medium or other computer program product configured for execution by one or more processors.

In accordance with some embodiments, a method is performed at an electronic device with a display and a physical keyboard. The method includes: displaying a text entry area with an insertion point on the display; detecting activation of a first physical key in the physical keyboard; in response to a determination that the activation of the first physical key lasts less than a first predefined time period, entering a single instance of a default character that corresponds to the first physical key in the text entry area; in response to a determination that the activation of the first physical key lasts more than the first predefined time period, displaying a character selection area on the display, the character selection area including the default character and a plurality of alternate characters that correspond to the first physical key; while displaying the character selection area, detecting activation of a second physical key in the physical keyboard; in response to a determination that the activated second physical key is an arrow key, moving a current character focus in the character selection area in accordance with a direction of the arrow key; and in response to a determination that the activated second physical key is the first physical key: entering in the text entry area a single instance of a character that has the current character focus in the character selection area and ceasing to display the character selection area.

In accordance with some embodiments, an electronic device includes a display, a physical keyboard, one or more processors, memory, and one or more programs. The one or more programs are stored in the memory and configured to be executed by the one or more processors. The one or more programs include instructions for: displaying a text entry area with an insertion point on the display; detecting activation of a first physical key in the physical keyboard; in response to a determination that the activation of the first physical key lasts less than a first predefined time period, entering a single instance of a default character that corresponds to the first physical key in the text entry area; in response to a determination that the activation of the first physical key lasts more than the first predefined time period, displaying a character selection area on the display, the character selection area including the default character and a plurality of alternate characters that correspond to the first physical key; while displaying the character selection area, detecting activation of a second physical key in the physical keyboard; in response to a determination that the activated second physical key is an arrow key, moving a current character focus in the character selection area in accordance with a direction of the arrow key; and in response to a determination that the activated second physical key is the first physical key: entering in the text entry area a single instance of a character that has the current character focus in the character selection area and ceasing to display the character selection area.

In accordance with some embodiments, a computer readable storage medium has stored therein instructions which when executed by an electronic device with a display and a physical keyboard, cause the device to: display a text entry area with an insertion point on the display; detect activation of a first physical key in the physical keyboard; in response to a determination that the activation of the first physical key lasts less than a first predefined time period, enter a single instance of a default character that corresponds to the first physical key in the text entry area; in response to a determination that the activation of the first physical key lasts more than the first predefined time period, display a character selection area on the display, the character selection area including the default character and a plurality of alternate characters that correspond to the first physical key; while displaying the character selection area, detect activation of a second physical key in the physical keyboard; in response to a determination that the activated second physical key is an arrow key, move a current character focus in the character selection area in accordance with a direction of the arrow key; and in response to a determination that the activated second physical key is the first physical key: enter in the text entry area a single instance of a character that has the current character focus in the character selection area and cease to display the character selection area.

In accordance with some embodiments, a graphical user interface on an electronic device with a display, physical keyboard, a memory, and one or more processors to execute one or more programs stored in the memory includes a text entry area with an insertion point. In response to a determination that an activation of a first physical key in the physical keyboard lasts less than a first predefined time period, a single instance of a default character that corresponds to the first physical key is entered in the text entry area. In response to a determination that the activation of the first physical key lasts more than the first predefined time period, a character selection area is displayed on the display, the character selection area including the default character and a plurality of alternate characters that correspond to the first physical key. While displaying the character selection area, activation of a second physical key in the physical keyboard is detected. In response to a determination that a second physical key in the physical keyboard, activated while the character selection area is displayed, is an arrow key, a current character focus in the character selection area is moved in accordance with a direction of the arrow key. In response to a determination that the activated second physical key is the first physical key, a single instance of a character that has the current character focus in the character selection area is entered in the text entry area, and the character selection area ceases to be displayed.

In accordance with some embodiments, an electronic device includes: a display; physical keyboard; means for displaying a text entry area with an insertion point on the display; means for detecting activation of a first physical key in the physical keyboard; means for, in response to a determination that the activation of the first physical key lasts less than a first predefined time period, entering a single instance of a default character that corresponds to the first physical key in the text entry area; means for, in response to a determination that the activation of the first physical key lasts more than the first predefined time period, displaying a character selection area on the display, the character selection area including the default character and a plurality of alternate characters that correspond to the first physical key; means for, while displaying the character selection area, detecting activation of a second physical key in the physical keyboard; means for, in response to a determination that the activated second physical key is an arrow key, moving a current character focus in the character selection area in accordance with a direction of the arrow key; and in response to a determination that the activated second physical key is the first physical key: means for entering in the text entry area a single instance of a character that has the current character focus in the character selection area, and means for ceasing to display the character selection area.

In accordance with some embodiments, an information processing apparatus for use in an electronic device with a display and a physical keyboard includes: means for displaying a text entry area with an insertion point on the display; means for detecting activation of a first physical key in the physical keyboard; means for, in response to a determination that the activation of the first physical key lasts less than a first predefined time period, entering a single instance of a default character that corresponds to the first physical key in the text entry area; means for, in response to a determination that the activation of the first physical key lasts more than the first predefined time period, displaying a character selection area on the display, the character selection area including the default character and a plurality of alternate characters that correspond to the first physical key; means for, while displaying the character selection area, detecting activation of a second physical key in the physical keyboard; means for, in response to a determination that the activated second physical key is an arrow key, moving a current character focus in the character selection area in accordance with a direction of the arrow key; and in response to a determination that the activated second physical key is the first physical key: means for entering in the text entry area a single instance of a character that has the current character focus in the character selection area, and means for ceasing to display the character selection area.

In accordance with some embodiments, an electronic device includes a display unit configured to display a text entry area with an insertion point, a physical keyboard unit configured to receive activations of physical keys in the physical keyboard unit, and a processing unit coupled to the display unit and the physical keyboard unit. The processing unit is configured to: detect activation of a first physical key in the physical keyboard unit; in response to a determination that the activation of the first physical key lasts less than a first predefined time period, enter a single instance of a default character that corresponds to the first physical key in the text entry area; in response to a determination that the activation of the first physical key lasts more than the first predefined time period, enable display of a character selection area on the display unit, the character selection area including the default character and a plurality of alternate characters that correspond to the first physical key; while displaying the character selection area, detect activation of a second physical key in the physical keyboard unit; in response to a determination that the activated second physical key is an arrow key, move a current character focus in the character selection area in accordance with a direction of the arrow key; and in response to a determination that the activated second physical key is the first physical key: enter in the text entry area a single instance of a character that has the current character focus in the character selection area, and cease to display the character selection area.

Thus, electronic devices with displays and physical keyboards are provided with faster, more efficient methods and interfaces for entering alternate characters, thereby increasing the effectiveness, efficiency, and user satisfaction with such devices. Such methods and interfaces may complement or replace conventional methods for entering alternate characters.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1:
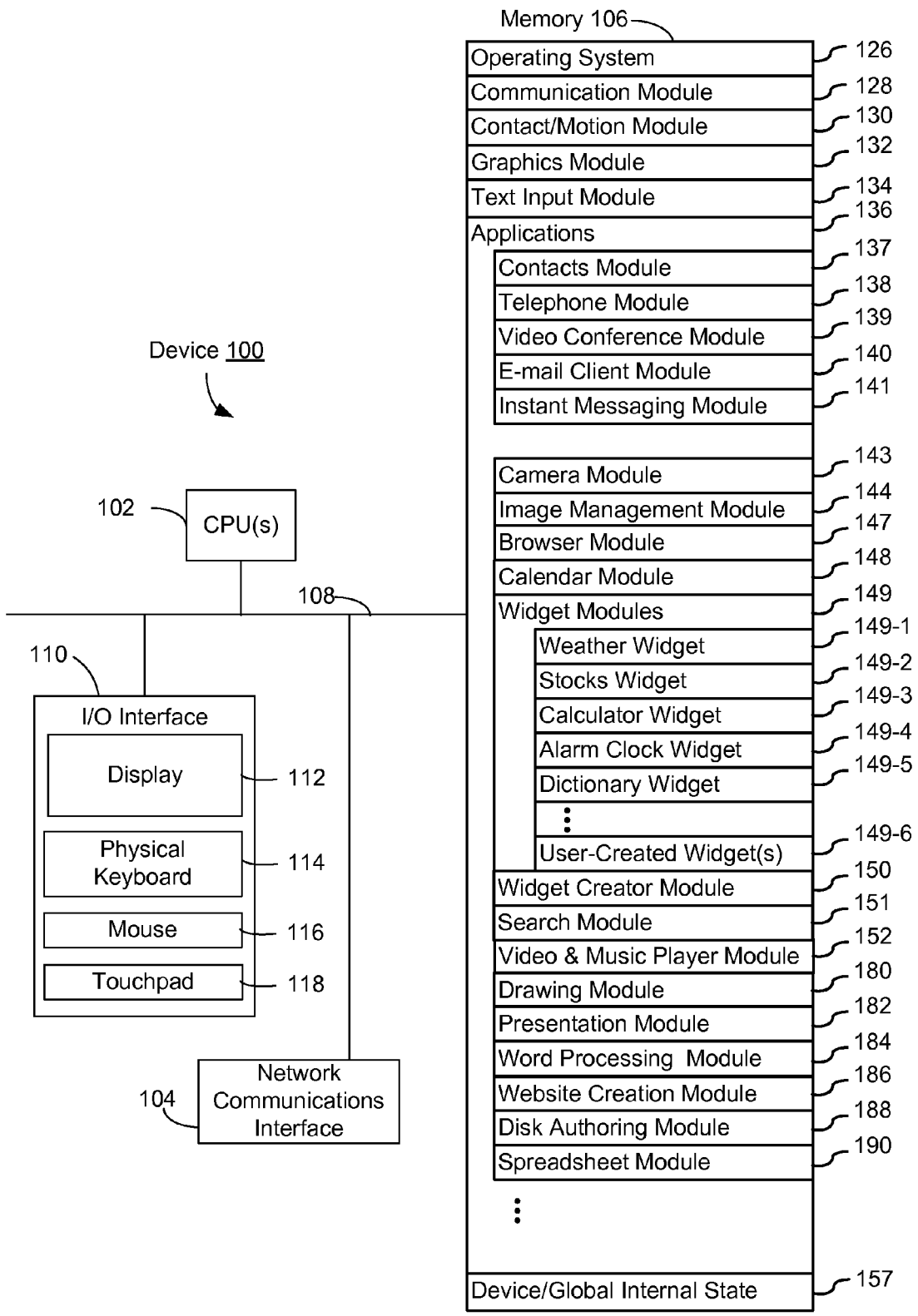
FIG. 1 is a block diagram of an exemplary electronic device with a display and a physical keyboard in accordance with some embodiments.

Sometimes a user may need to enter variants of a character, such as a combination of the character with a diacritical mark. Existing methods of entering alternate characters typically require the user to remember a particular combination of physical keys (e.g., shift+option+key); enter a code (which the user has to memorize or look up) associated with the desired character; or navigate through multiple menus and options. A more efficient method of entering such character variants is described below. To enter a variant or alternate of a character, the physical key to which the character corresponds is activated for a duration longer than a predefined time period. A temporary character selection area is displayed with the default character and the alternate characters. The desired character is selected from the character selection area by any one of several complementary methods, such as highlighting the desired character and activating the physical key again, or clicking on the desired character with a mouse or touchpad.

Below, FIGS. 1, 2A, 2B, and 5 provide a description of exemplary devices. FIGS. 3A-3P illustrate exemplary user interfaces for entering alternate characters using a physical keyboard. FIGS. 4A-4D are flow diagrams illustrating a method of entering alternate characters using a physical keyboard. The user interfaces in FIGS. 3A-3P are used to illustrate the processes in FIGS. 4A-4D.

Exemplary Devices

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone with a physical keyboard, which also contains other functions, such as PDA and/or music player functions. Other portable electronic devices, such as laptops or tablet computers with physical keyboards, may also be used. It should also be understood that, in some embodiments, the device is not a portable communications device, but is a desktop computer with a physical keyboard.

In the discussion that follows, an electronic device that includes a display and a physical keyboard is described. It should be understood, however, that the electronic device may include one or more other physical user-interface devices, such as a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the physical keyboard. One or more functions of the physical keyboard as well as corresponding information displayed on the device may be adjusted and/or varied from one application to the next and/or within a respective application. In this way, a common physical architecture (such as the physical keyboard) of the device may support the variety of applications with user interfaces that are intuitive and transparent to the user.

FIG. 1 is a block diagram of an exemplary electronic device with a display and a physical keyboard in accordance with some embodiments. Device 100 need not be portable. In some embodiments, device 100 is a laptop computer, a desktop computer, a tablet computer, a multimedia player device, a navigation device, an educational device (such as a child's learning toy), a gaming system, a portable communications device (e.g., a mobile phone or smartphone), or a control device (e.g., a home or industrial controller). Device 100 typically includes one or more processing units (CPU's) 102, one or more network or other communications interfaces 104, memory 106, and one or more communication buses 108 for interconnecting these components. Communication buses 108 may include circuitry (sometimes called a chipset) that interconnects and controls communications between system components. Device 100 includes input/output (I/O) interface 110 comprising display 112, which may be a touch screen display, and a physical keyboard 114. I/O interface 110 may also include a mouse (or other pointing device) 116 and/or touchpad 118. Memory 106 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 106 may optionally include one or more storage devices remotely located from CPU(s) 102.

It should be appreciated that device 100 is only one example of an electronic device, and that device 100 may have more or fewer components than shown, may combine two or more components, or may have a different configuration or arrangement of the components. The various components shown in FIG. 1 may be implemented in hardware, software, or a combination of both hardware and software, including one or more signal processing and/or application specific integrated circuits.

In some embodiments, the software components stored in memory 106 include operating system 126, communication module (or set of instructions) 128, contact/motion module (or set of instructions) 130, graphics module (or set of instructions) 132, text input module (or set of instructions) 134, and applications (or sets of instructions) 136. Furthermore, in some embodiments memory 102 stores device/global internal state 157, as shown in FIG. 1. Device/global internal state 157 includes one or more of: active application state, indicating which applications, if any, are currently active; display state, indicating what applications, views or other information occupy various regions of display 112; and input state, including information obtained from the device's input control devices (e.g., physical keyboard 114, mouse 116, and/or touchpad 118).

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more communication buses 108 and also includes various software components for handling data received through communication buses 108. In some embodiments, communication module 128 facilitates communication with devices in I/O interface 110, such as physical keyboard 114 and mouse 116.

Contact/motion module 130 may detect contact with touchpad 118 and other touch sensitive devices (e.g., a touch screen). Contact/motion module 130 includes various software components for performing various operations related to detection of contact, such as determining if contact has occurred (e.g., detecting a finger-down event), determining if there is movement of the contact and tracking the movement across a touch-sensitive surface (e.g., detecting one or more finger-dragging events), and determining if the contact has ceased (e.g., detecting a finger-up event or a break in contact). Contact/motion module 130 receives contact data from the touch-sensitive surface (e.g., touchpad 118). Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts).

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on display 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display 112.

Text input module 134, which may be a component of graphics module 132, provides soft keyboards or mappings of physical keys in a physical keyboard to various key layouts for entering text in various applications (e.g., contacts 137, e-mail 140, IM 141, browser 147, and any other application that needs text input).

Applications 136 may include the following modules (or sets of instructions), or a subset or superset thereof:

contacts module 137 (sometimes called an address book or contact list);
    telephone module 138;
    video conferencing module 139;
    e-mail client module 140;
    instant messaging (IM) module 141;
    workout support module 142;
    camera module 143 for still and/or video images;
    image management module 144;
    browser module 147;
    calendar module 148;
    widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
    widget creator module 150 for making user-created widgets 149-6;
    search module 151; and/or
    video and music player module 152, which may be made up of a video player module and a music player module.

Examples of other applications 136 that may be stored in memory 102 include drawing module 180, presentation module 182, word processing module 184, website creation module 186, disk authoring module 188, spreadsheet module 190, other image editing applications, JAVA-enabled applications, encryption, digital rights management, voice recognition, and/or voice replication.

In conjunction with display 112, communication module 128, contact module 130, graphics module 132, and text input module 134, contacts module 137 may be used to manage an address book or contact list (e.g., stored in application internal state 192 of contacts module 137 in memory 106), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with display 112, communication module 128, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. In some embodiments, telephone module 138 facilitates telephony by voice over Internet Protocol (VOIP).

In conjunction with display 112, communication module 128, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with display 112, communication module 128, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images.

In conjunction with display 112, communication module 128, contact module 130, graphics module 132, and text input module 134, the instant messaging module 141 includes executable instructions to enter a sequence of characters corresponding to an instant message, to modify previously entered characters, to transmit a respective instant message (for example, using XMPP, SIMPLE, or IMPS for Internet-based instant messages), to receive instant messages and to view received instant messages. In some embodiments, transmitted and/or received instant messages may include graphics, photos, audio files, video files and/or other attachments.

In conjunction with display 112, communication module 128, optical sensor(s) (not shown), contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with display 112, communication module 128, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with display 112, communication module 128, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with display 112, communication module 128, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with display 112, communication module 128, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with display 112, communication module 128, contact module 130, graphics module 132, text input module 134, and browser module 147, the widget creator module 150 may be used by a user to create widgets (e.g., turning a user-specified portion of a web page into a widget).

In conjunction with display 112, communication module 128, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with display 112, communication module 128, contact module 130, graphics module 132, audio circuitry 110, speaker 111, and browser module 147, video and music player module 152 includes executable instructions that allow the user to download and play back recorded music and other sound files stored in one or more file formats, such as MP3 or AAC files, and executable instructions to display, present or otherwise play back videos (e.g., on display 112).

Each of the above identified elements in FIG. 1 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 106 may store a subset of the modules and data structures identified above. Furthermore, memory 106 may store additional modules and data structures not described above.

Figure 2A:
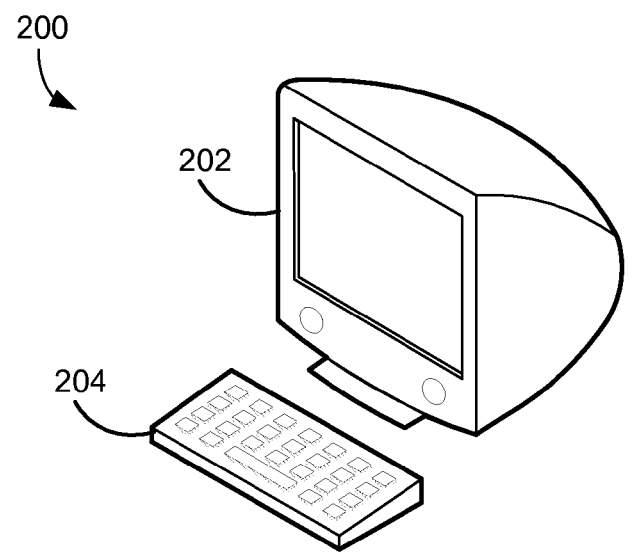
FIGS. 2A-2B illustrate exemplary electronic devices having physical keyboards in accordance with some embodiments.
Figure 2B:
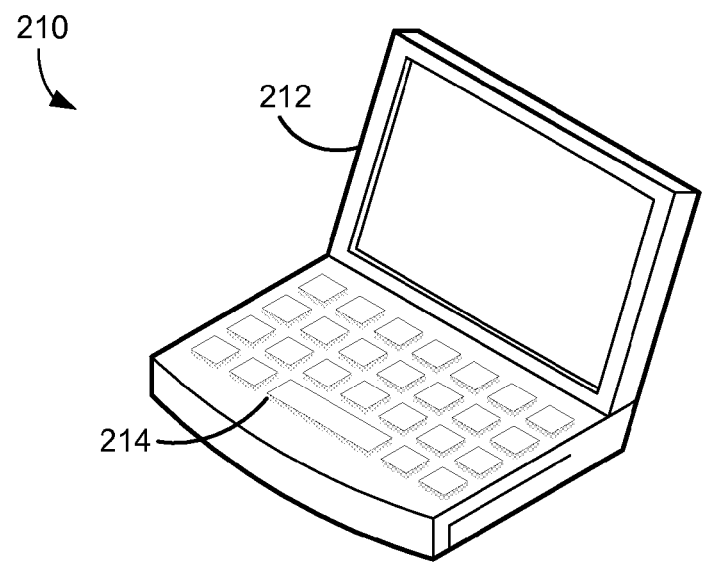
Figure 3A:
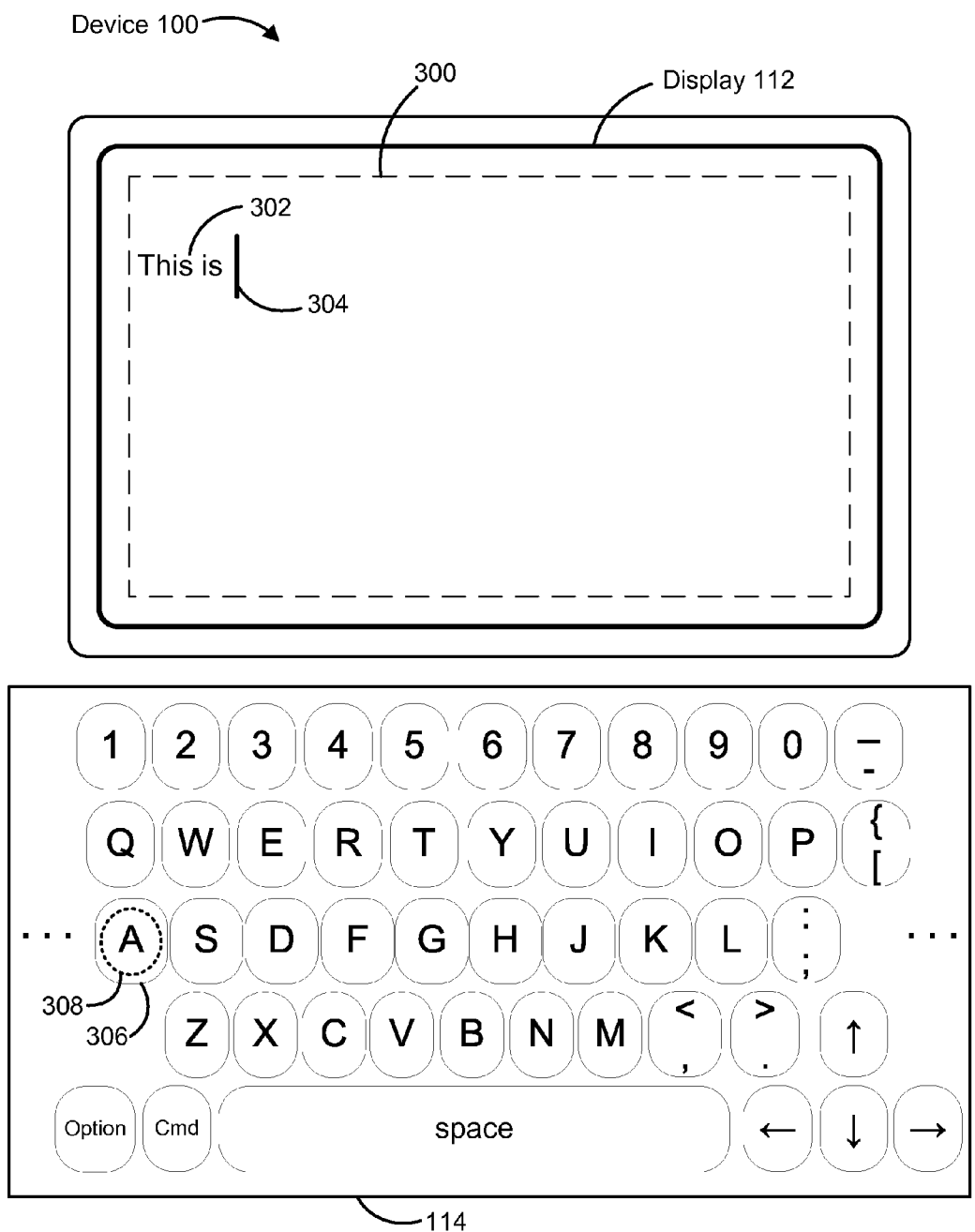
FIGS. 3A-3P illustrate exemplary user interfaces for entering alternate characters using a physical keyboard in accordance with some embodiments.

FIGS. 2A-2B illustrate exemplary multifunction devices having physical keyboards in accordance with some embodiments. FIG. 2A illustrates a desktop computer 200, which is an example of device 100. Desktop computer 200 includes a display 202 (an example of display 112 in device 100) and a physical keyboard 204 (an example of physical keyboard 114 in device 100). In some embodiments, display 202 and other components of desktop computer 200 (e.g., processor(s), memory, controllers, storage, etc.) are held together in a common chassis. In some other embodiments, display 202 is a distinct component (i.e., held in separate chassis) from the other components (e.g., processor(s), memory, controllers, storage, etc.).

Physical keyboard 204 includes a plurality of physical keys, at least some of which correspond to respective characters. When a key corresponding to a character is activated, the corresponding character may be entered as text, which may be displayed on display 202 (e.g., in a text entry area).

FIG. 2B illustrates a laptop or notebook computer 210, which is another example of device 100. Laptop computer 210 includes a display 212 (an example of display 112 in device 100) and a physical keyboard 214 (an example of physical keyboard 114 in device 100). Display 212, physical keyboard 214, and other components of laptop computer 210 (e.g., processor(s), memory, controllers, storage, etc.) are held together in a common chassis.

Physical keyboard 214 includes a plurality of physical keys, at least some of which correspond to respective characters. When a key corresponding to a character is activated, the corresponding character may be entered as text, which may be displayed on display 212 (e.g., in a text entry area).

User Interfaces and Associated Processes

Attention is now directed towards embodiments of user interfaces ("UI") and associated processes that may be implemented on an electronic device with a display and a physical keyboard, such as device 100.

FIGS. 3A-3P illustrate exemplary user interfaces for entering alternate characters using a physical keyboard in accordance with some embodiments. The user interfaces in these figures are used to illustrate the processes described below, including the processes in FIGS. 4A-4D. It should be appreciated that in FIGS. 3A-3P, for sake of convenience, only certain components of device 100 (e.g., display 112 and physical keyboard 114) are depicted.

FIG. 3A illustrates text entry area 300 displayed on display 112 of a device (e.g., device 100). Text entry area 300 may be displayed in a user interface of an application. In some embodiments, text entry area 300 is in a text entry field or in an application where a document (e.g., a text document, a presentation slide, a spreadsheet, a drawing, etc.) is displayed. Also displayed, in text entry area 300, are input text 302 and insertion point 304. Input text 302 includes text entered into text entry area 302 by a user. Insertion point 304 marks a position where the next entered character will be entered into input text 302. Insertion point 304 may be displayed with empty input text 302 (e.g., when the user has not entered any text yet).

Device 100 also includes physical keyboard 114. Physical keyboard 114 includes keys that correspond to characters (e.g., letters, punctuation marks, etc.) and functional keys (e.g., enter key, command key, shift key, etc.). A key on physical keyboard 114 may be activated by pressing down on the key. In some embodiments, a duration of the activation of a key is measured from when the key is pressed down to when the key is released.

Figure 3B:
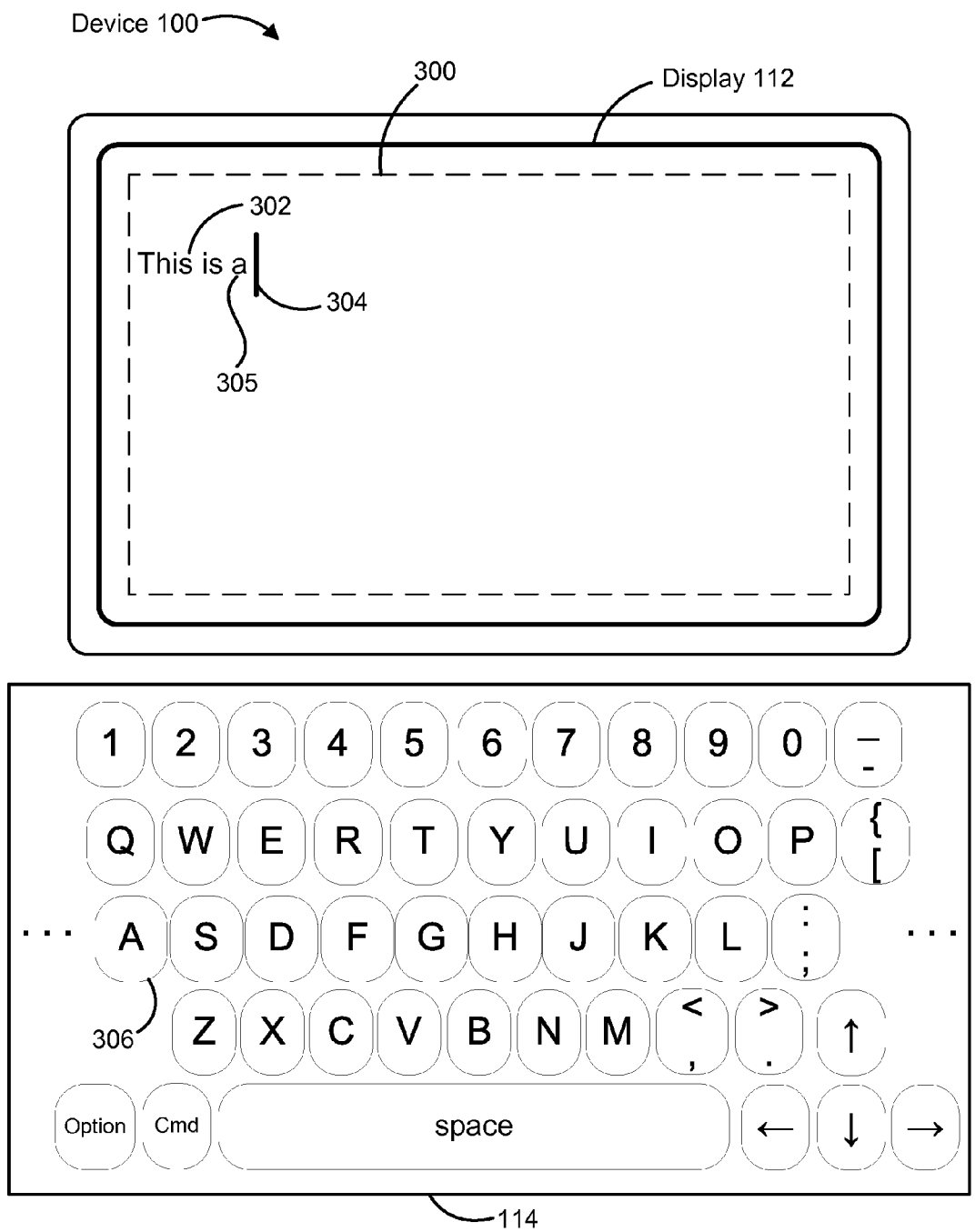

Activation 308 of key 306 is detected on physical keyboard 114 of device 100. As shown in FIG. 3A, key 306 corresponds to the letter "A." The action taken by device 100 in response to the detection of activation 308 of key 306 depends on the duration of activation 308. If activation 308 lasts less than a first predefined time period (e.g., 0.2, 0.3, 0.4, 0.5 seconds or any reasonable time), a single instance of character "a" 305 is entered into input text 302 at the position indicated by insertion point 304, as shown in FIG. 3B. Compared to FIG. 3A, in FIG. 3B input text 302 has character "a" 305 at the tail end and insertion point 304 has advanced to the next position after entry of character "a" 305. In this example, character "a" 305 is the default character corresponding to key 306. (As is known for physical keyboards, if a shift key (not shown) in physical keyboard 114 has been pressed when key 306 is activated, then the default character is "A," i.e., "a" is capitalized.)

Figure 3C:
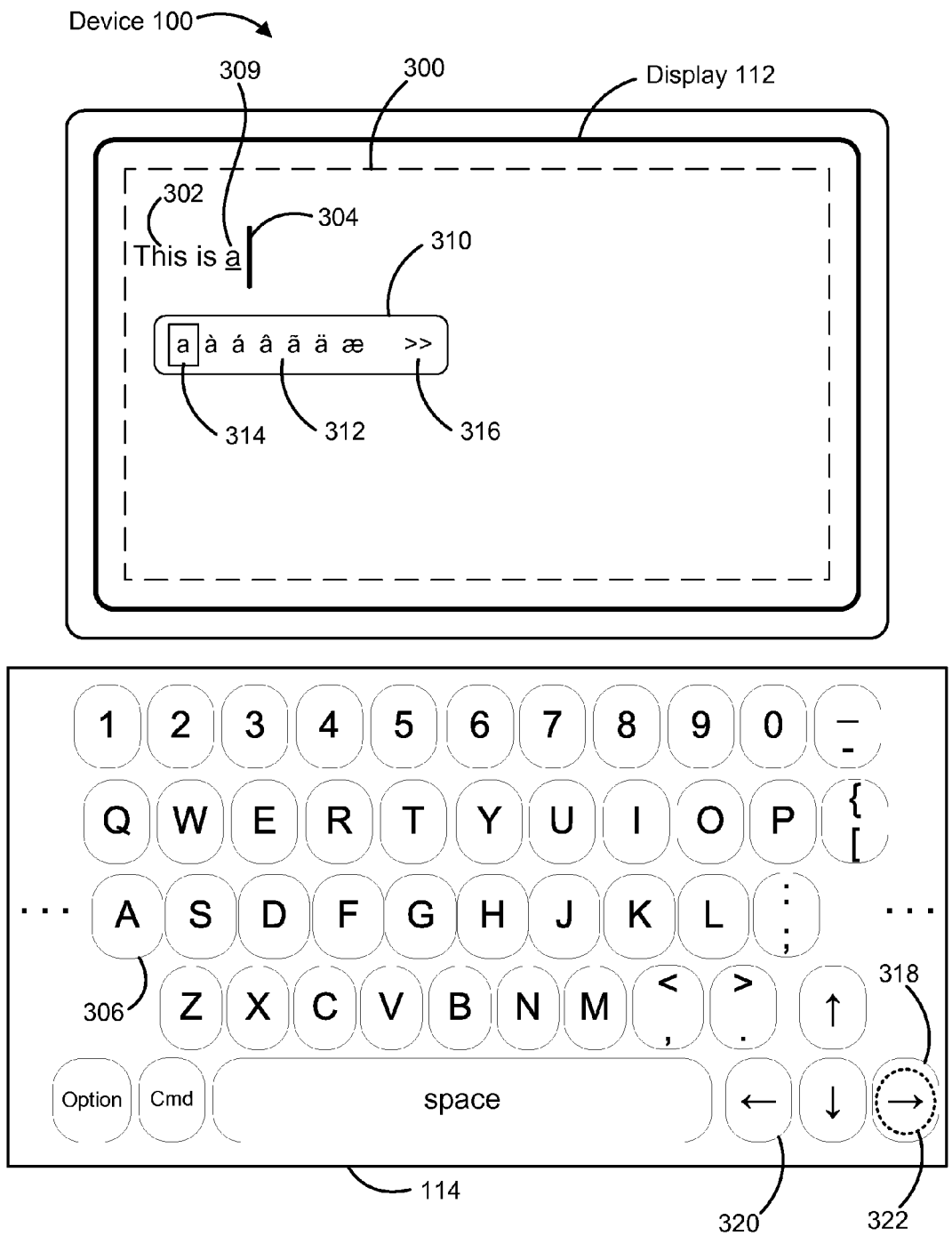

If activation 308 lasts more than the first predefined time period, a character is not immediately entered. Instead, a character is provisionally entered into input text 302 (e.g., at the position indicated by insertion point 304), pending selection of a character from character selection area 310. For example, as shown in FIG. 3C, provisional character 309 is entered into input text 302 with underlining; the underlining indicates that the "a" is provisionally entered pending selection of a character from character selection area 310. Character selection area 310 is displayed on display 112 and includes candidate characters 312 and current character focus 314.

Candidate characters 312 include the default character corresponding to activated key 306 (e.g., character "a" in FIG. 3C) and alternate characters that correspond to activated key 306. In some embodiments, the alternate characters include combinations of the default character corresponding to activated key 306 with diacritical or accent marks, or ligatures that include the default character corresponding to activated key 306. For example, as shown in FIG. 3C, the alternate characters include "à," "á," "â," "ã," "ä," and "æ."

In some embodiments, the alternate characters that are displayed as candidate characters 312 in character selection area 310 are selected for display by device 100 based on the usage history of a user of the device. For example, the alternate characters corresponding to key 306 that are displayed may be the most frequently used, amongst the alternate characters corresponding to key 306, by a user of the device.

In some embodiments, the alternate characters that are displayed as candidate characters 312 in character selection area 310 are user configurable. That is, the user may configure which alternate characters are selected for display in character selection area 310. For example, the user may configure the language or key-to-character mapping for keyboard 114. The alternate characters that are displayed in character selection area 310 may change based on the language or mapping (which may be related to a language), as certain alternate characters may be used in some languages or mappings, but not others.

In some embodiments, the alternate characters that are displayed as candidate characters 312 in character selection area 310 are based on the physical keyboard. Different physical keyboards, with different key layouts, may correspond to different languages. As described above, certain alternate characters may be used in some languages, but not others. Thus, the alternate characters that are displayed in character selection area 310 may be based on the physical keyboard.

In some embodiments, a subset of available candidate characters 312 is displayed in character selection area 310. Character selection area 310 includes an additional options icon 316 that, when activated, activates display of additional candidate characters 312. The activation of the additional options icon 316 is further described below, with reference to FIGS. 3O-3P.

Provisional character 309 is displayed as whichever candidate character 312 has the current character focus 314.

Thus, in FIG. 3C, the character "a" amongst candidate characters 312 has the current character focus 314, and provisional character 309 is displayed as "a" with underlining. In some embodiments (not shown), just the current character focus 314 is shown, without showing the provisional character 309.

Figure 3D:
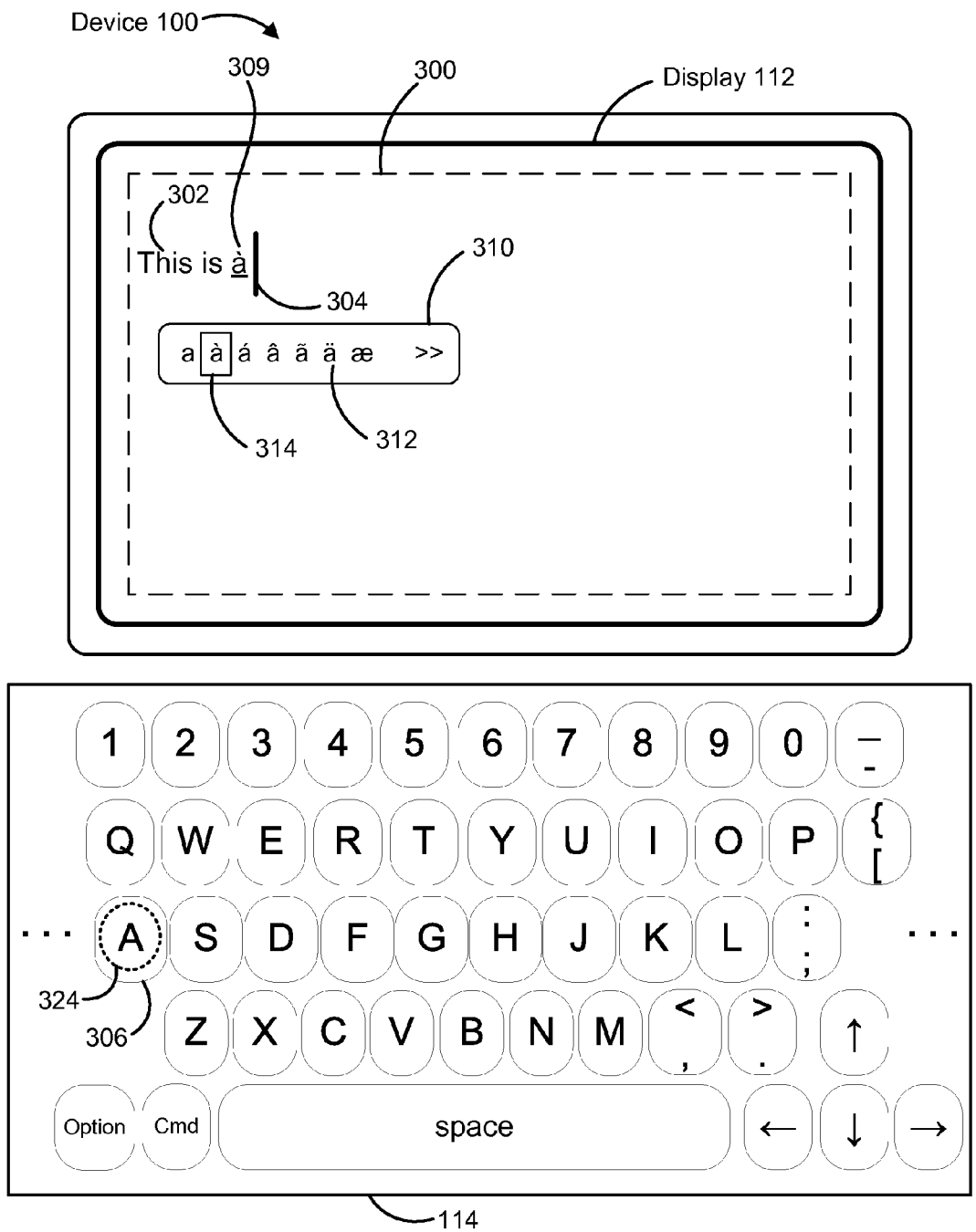

While character selection area 310 is displayed, other keys on physical keyboard 114 may be activated. For example, FIG. 3C shows detection of activation 322 of right arrow key 318. In response to the detection of activation 322 of right arrow key 318, current character focus 314 is moved, within character selection area 310, in accordance with the direction of right arrow key 318. Current character focus 314 moves rightward within character selection area 310 onto the character "à", in accordance with the direction of right arrow key 318, as shown in FIG. 3D. Provisional character 309 changes from "a" to "à" in accordance with the character that has the current character focus 314. Other arrow keys, such as left arrow key 320, an up arrow key, and a down arrow key, may also be used to move current character focus 314 in a direction corresponding to the arrow key direction.

Figure 3E:
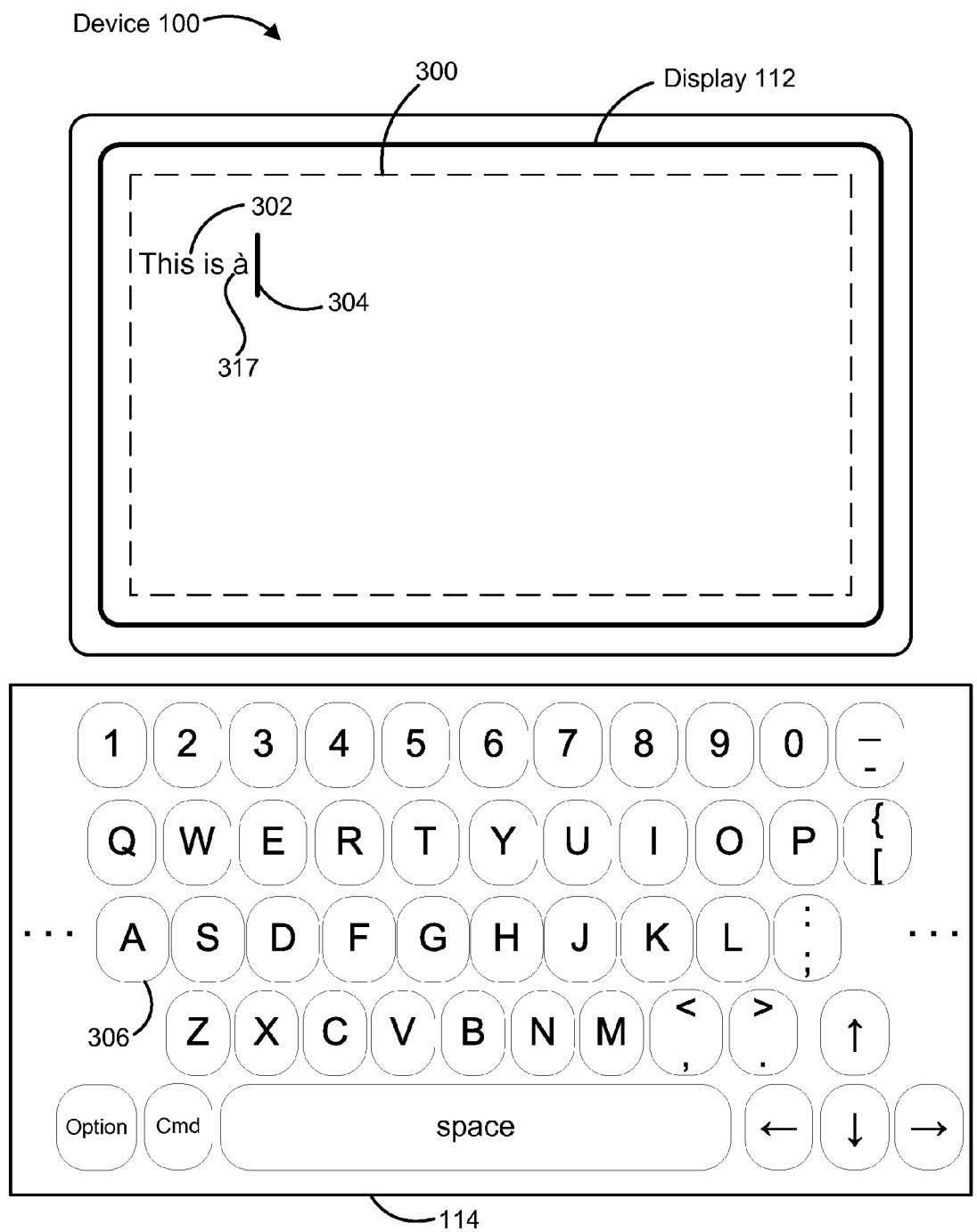

FIG. 3D also shows activation 324 of key 306 while the character "à" has the current character focus 314 within character selection area 310. In response to the detection of activation 324 of key 306, a single instance of character "à" 317 is entered into input text 302 at the position indicated by insertion point 304 and character selection area 310 ceases to be displayed, as shown in FIG. 3E; whichever candidate character is displayed as provisional character 309 as a result of that candidate character having the current character focus 314 is entered into input text 302 when the originally activated key (key 306) is activated while character selection area 310 is displayed.

Figure 3F:
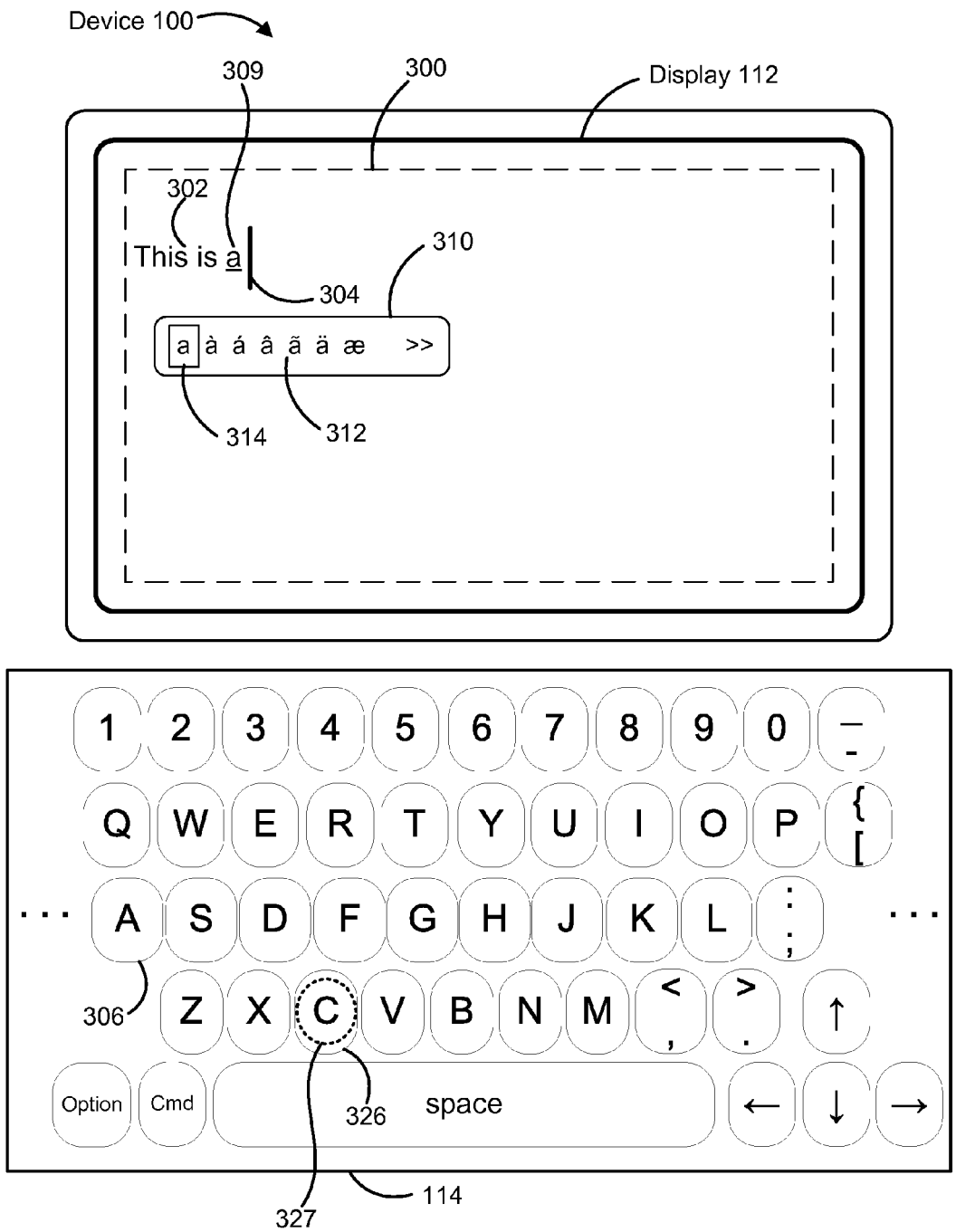
Figure 3G:
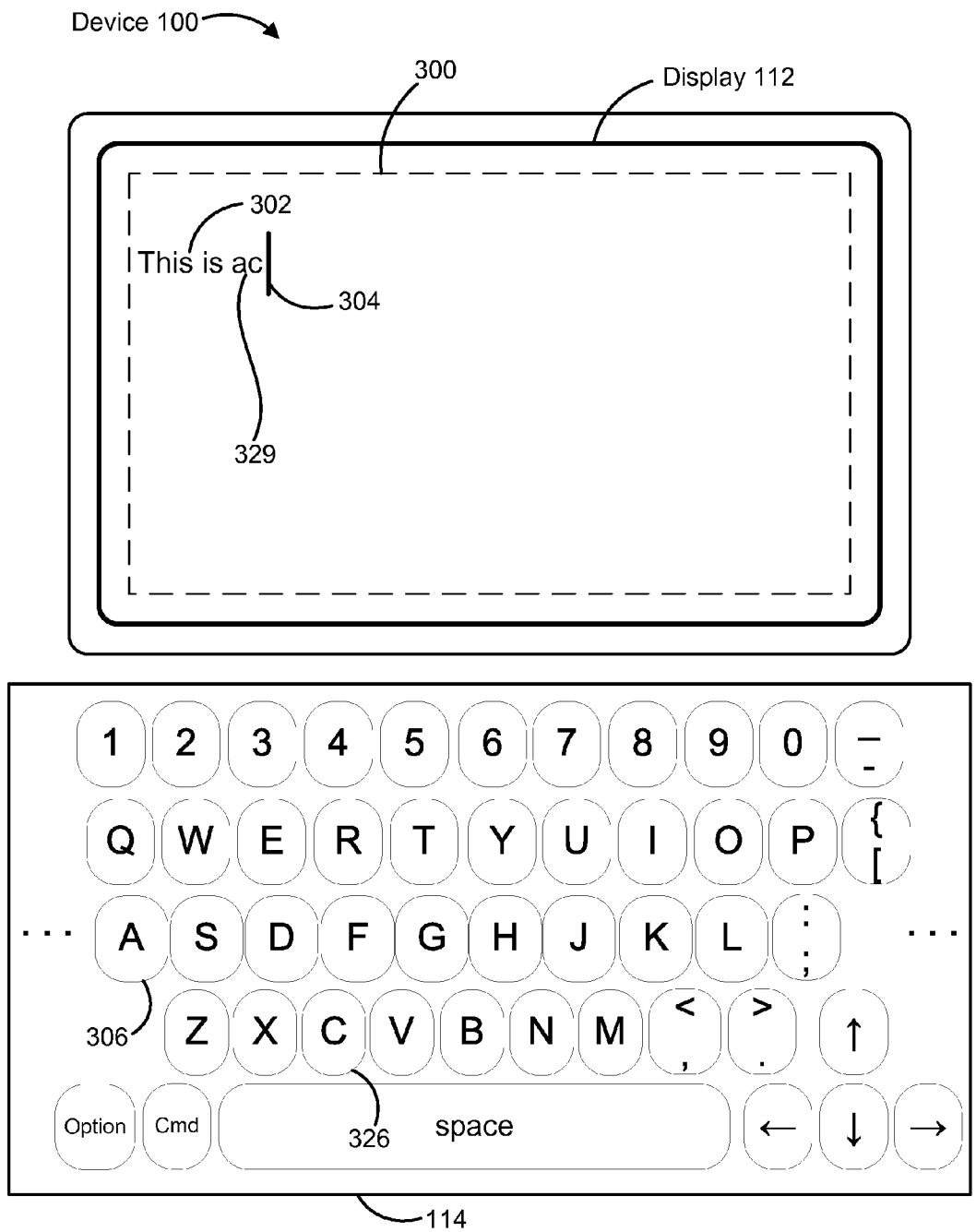

FIGS. 3F-3G illustrate an alternative way to enter one of the candidate characters 312 in character selection area 310. FIG. 3F shows character selection area 310, continuing from FIG. 3C, displayed in text entry area 300 on display 112. Provisional character 309 is displayed in input text 302, at the position indicated by insertion point 304, as the candidate character 312 that has current character focus 314 in character selection area 310. FIG. 3F also shows activation 327 of key 326, which corresponds to the letter "C" and is a different key from the originally activated "a" key 306.

In response to the detection of activation 327 of key 326, the two characters "ac" 329, which includes a single instance of character "à" and a single instance of character "c," are entered into input text 302 at the position indicated by insertion point 304, as shown in FIG. 3G. The character "à" is the candidate character 312 that has the current character focus 314 in FIG. 3F when key 326 is activated 327, and is entered in place of provisional character 309. The character "c" is the default character corresponding to key 326. Also, character selection area 310 ceases to be displayed. In other words, by activating a character key other than the originally activated character key, a candidate character with the current focus that corresponds to the originally activated key is entered as well as a character corresponding to the character key other than the originally activated key. This facilitates faster typing of characters on physical keyboard 114.

Figure 3H:
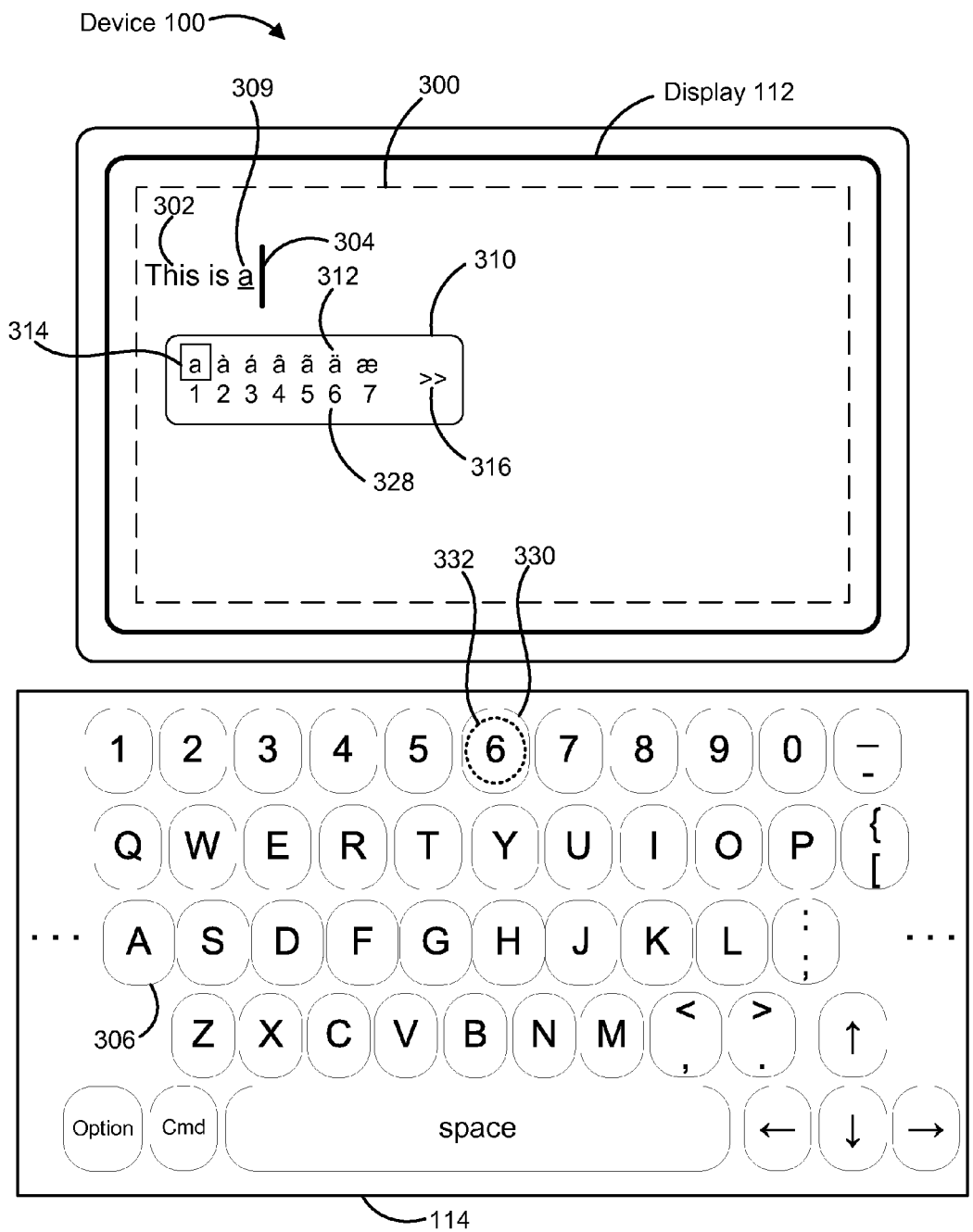
Figure 3I:
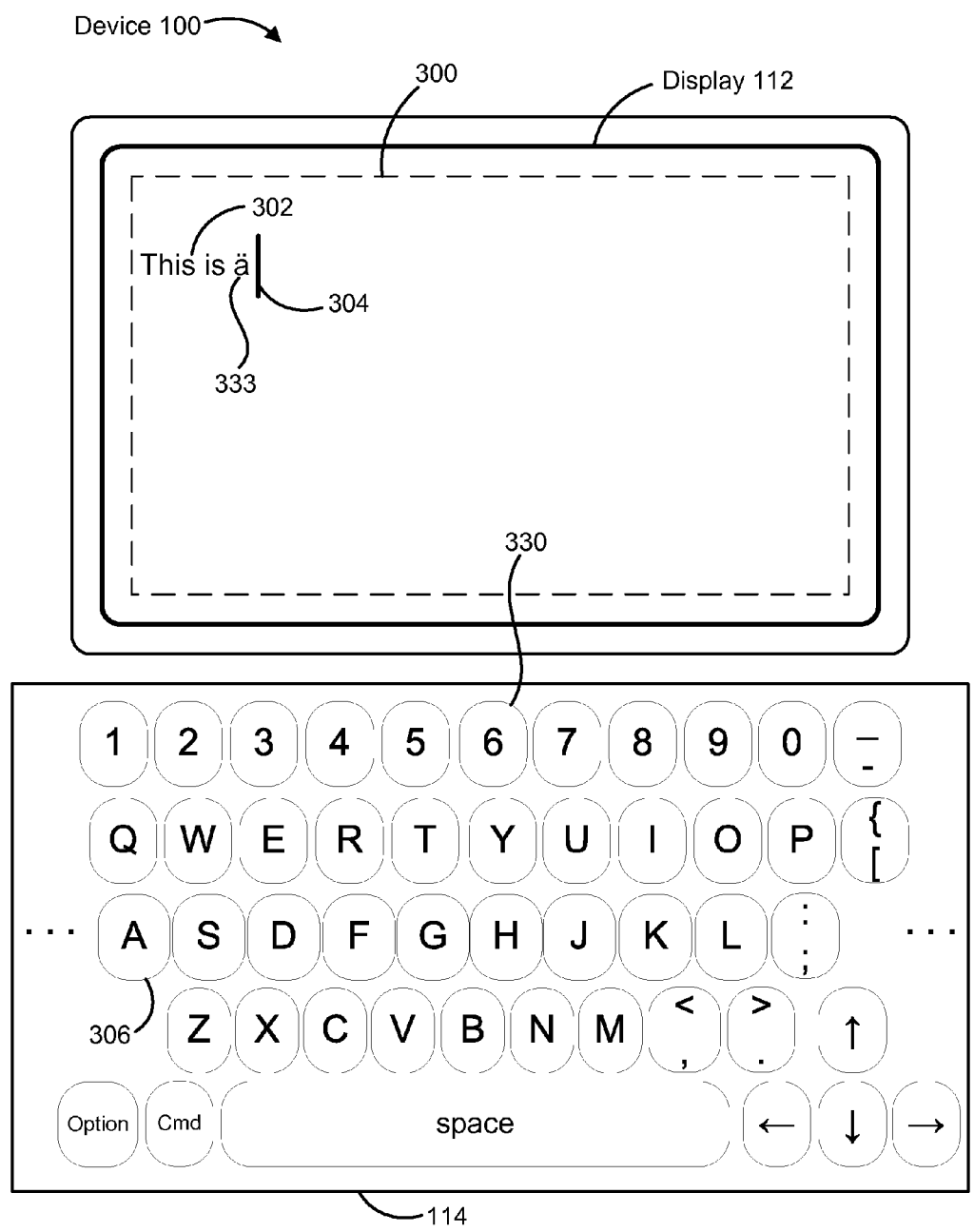

FIGS. 3H-3I illustrates another alternative way to enter one of the candidate characters 312 in character selection area 310. FIG. 3H shows character selection area 310 displayed in text entry area 300 in response to the detection of activation 308 (FIG. 3A) lasting longer than the first predefined time period. Character selection area 310 includes candidate characters 312, current character focus 314, and additional options icon 316. In FIG. 3H, character selection area further includes numbers 328 adjacent to candidate characters 312. Numbers 328 includes integers 1 thru 7, each number 328 corresponding to a respective candidate character 312. For example, the number "1" in numbers 328 corresponds to the character "a" in candidate characters 312, the number "2" in numbers 328 corresponds to the character "à" in candidate characters 312, the number "3" in numbers 328 corresponds to the character "á" in candidate characters 312, and so on.

Activation 332 of key 330 on physical keyboard 114 is detected. Key 330 corresponds to the number (and character) "6." In response to the detection of activation 332 of key 330, a single instance of character "ä" 333, corresponding to the number "6" in character selection area 310, is entered into input text 302 in place of provisional character 309, as shown in FIG. 3I, regardless of the character "a" having the current character focus 314 in character selection area 310. Also, character selection area 310 ceases to be displayed.

Figure 3J:
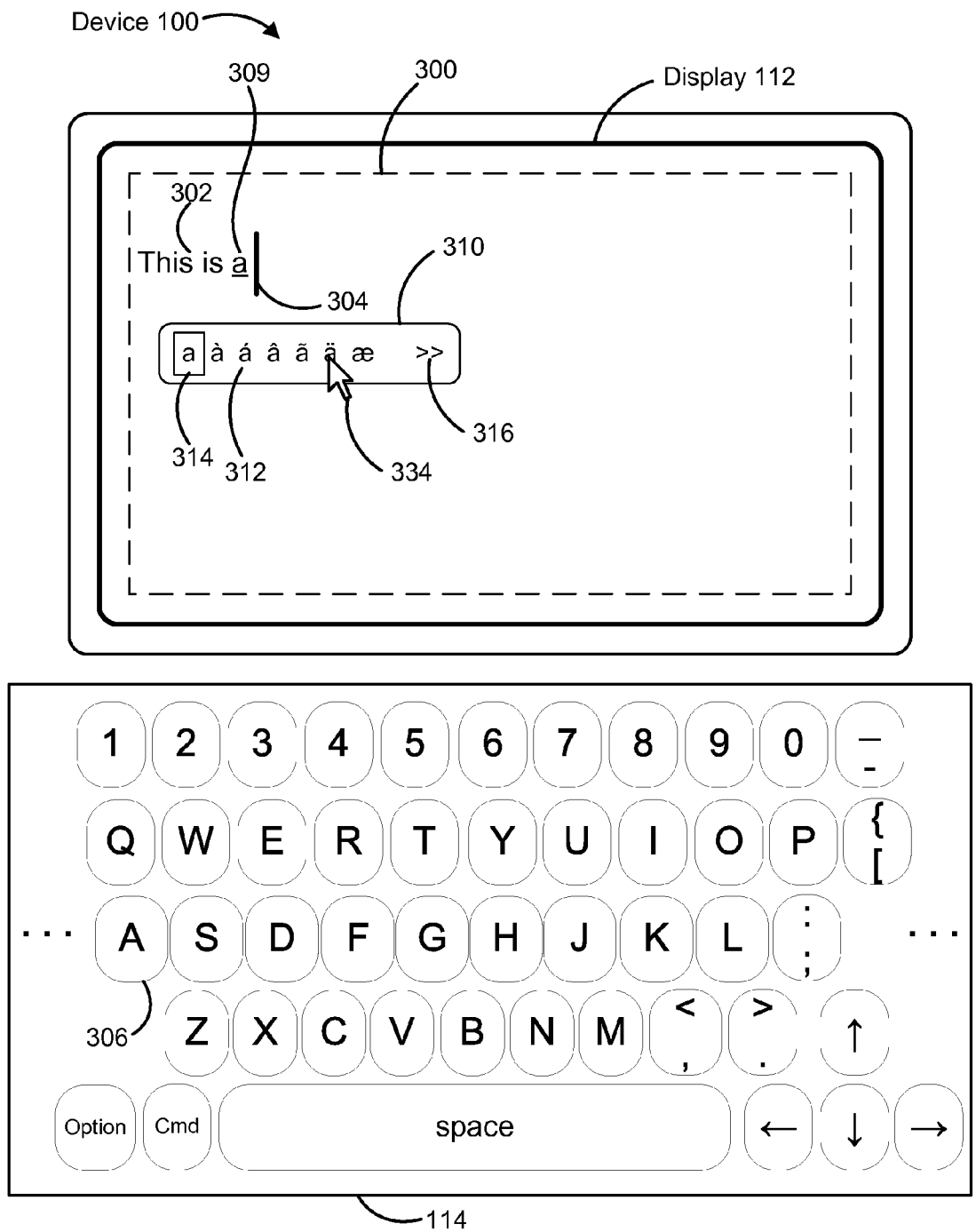
Figure 3K:
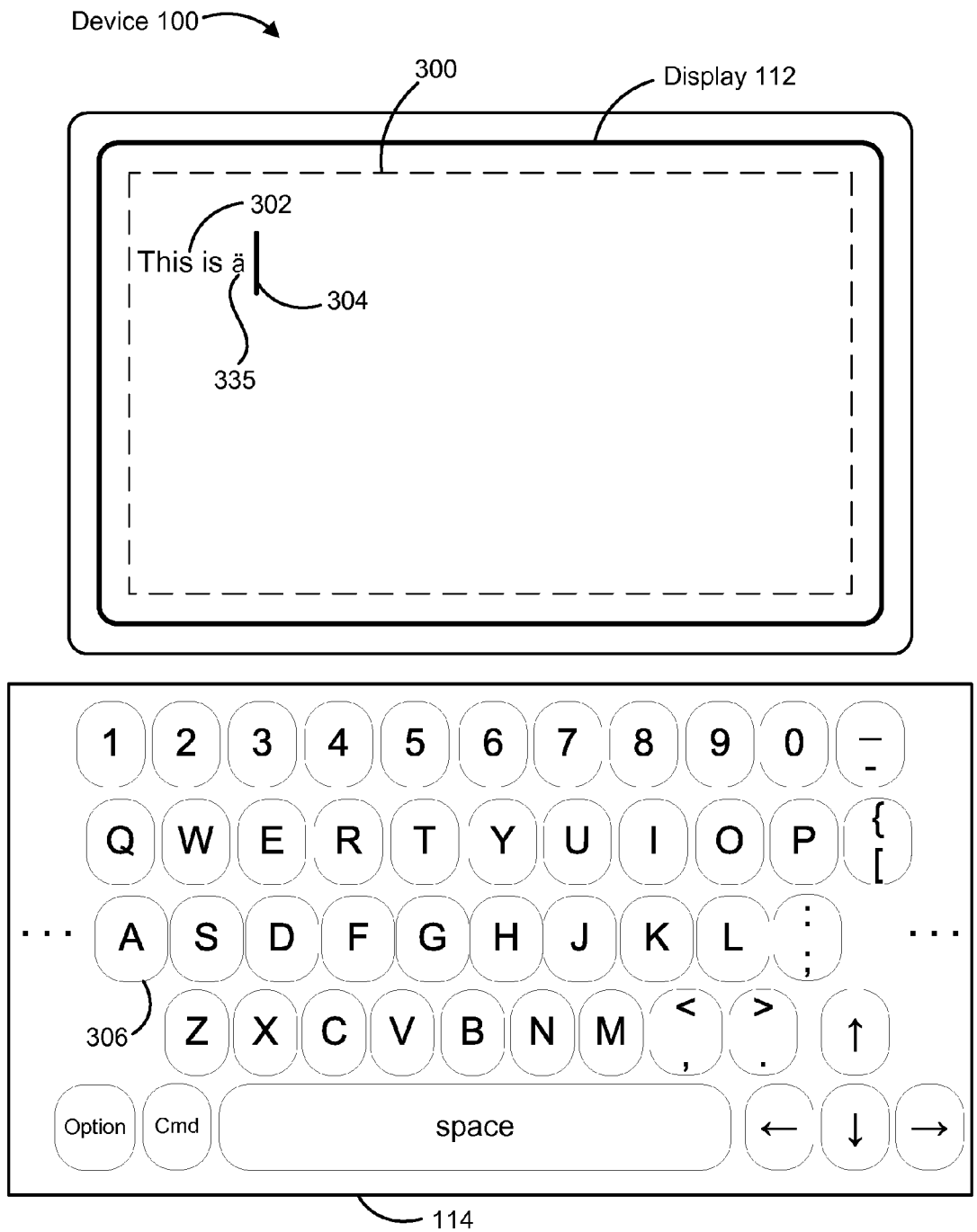

FIGS. 3J-3K illustrates another alternative way to enter one of the candidate characters 312 in character selection area 310. FIG. 3J shows character selection area 310, continuing from FIG. 3C, displayed in text entry area 300 on display 112. Provisional character 309 is displayed in input text 302, at the position indicated by insertion point 304, as the candidate character 312 that has current character focus 314 in character selection area 310. FIG. 3J also shows cursor 334 placed over the character "ä" amongst candidate characters 312 in character selection area 310. In some embodiments, cursor 334 is manipulated by a user using an input device of device 100 (e.g., mouse 116 or touchpad 118). Cursor 334 may be activated by the user (e.g., by a left click on a multi-button mouse 116, clicking on single-button mouse 116, or tapping on touchpad 118) while cursor 334 is over the character "ä" in character selection area 310.

In response to detection of activation of cursor 334 over the character "ä" in character selection area 310, a single instance of character "ä" 335 is entered into input text 302 in place of provisional character 309, as shown in FIG. 3K, regardless of the character "a" having the current character focus 314 in character selection area 310. Also, character selection area 310 ceases to be displayed.

Figure 3L:
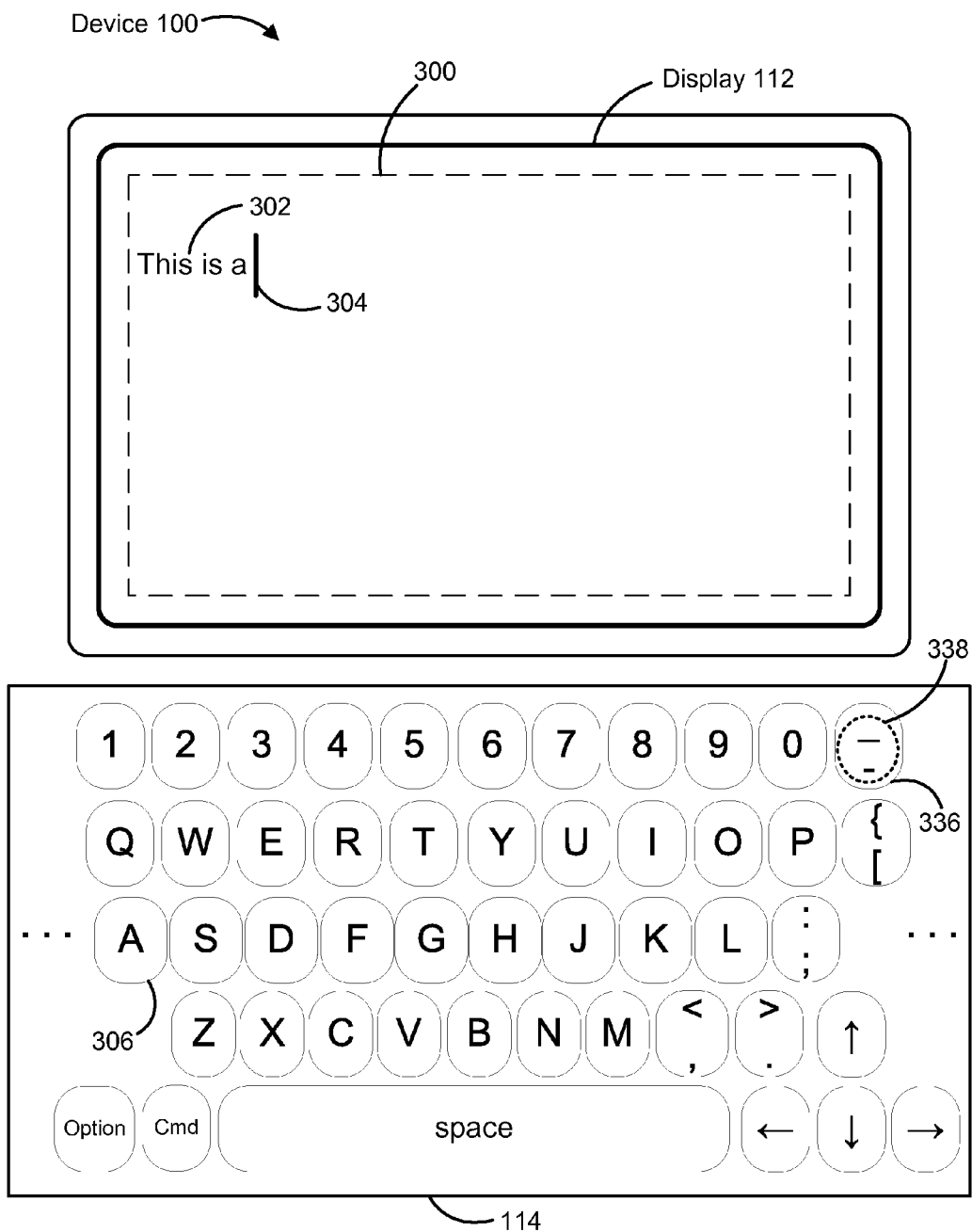

FIG. 3L illustrates activation 338 of key 336 while character selection display 310 is not displayed (e.g., after a character has been entered into input text 302). Key 336 is a non-letter key, corresponding to the non-letter character "-." Activation 338 is detected on key 336.

Figure 3M:
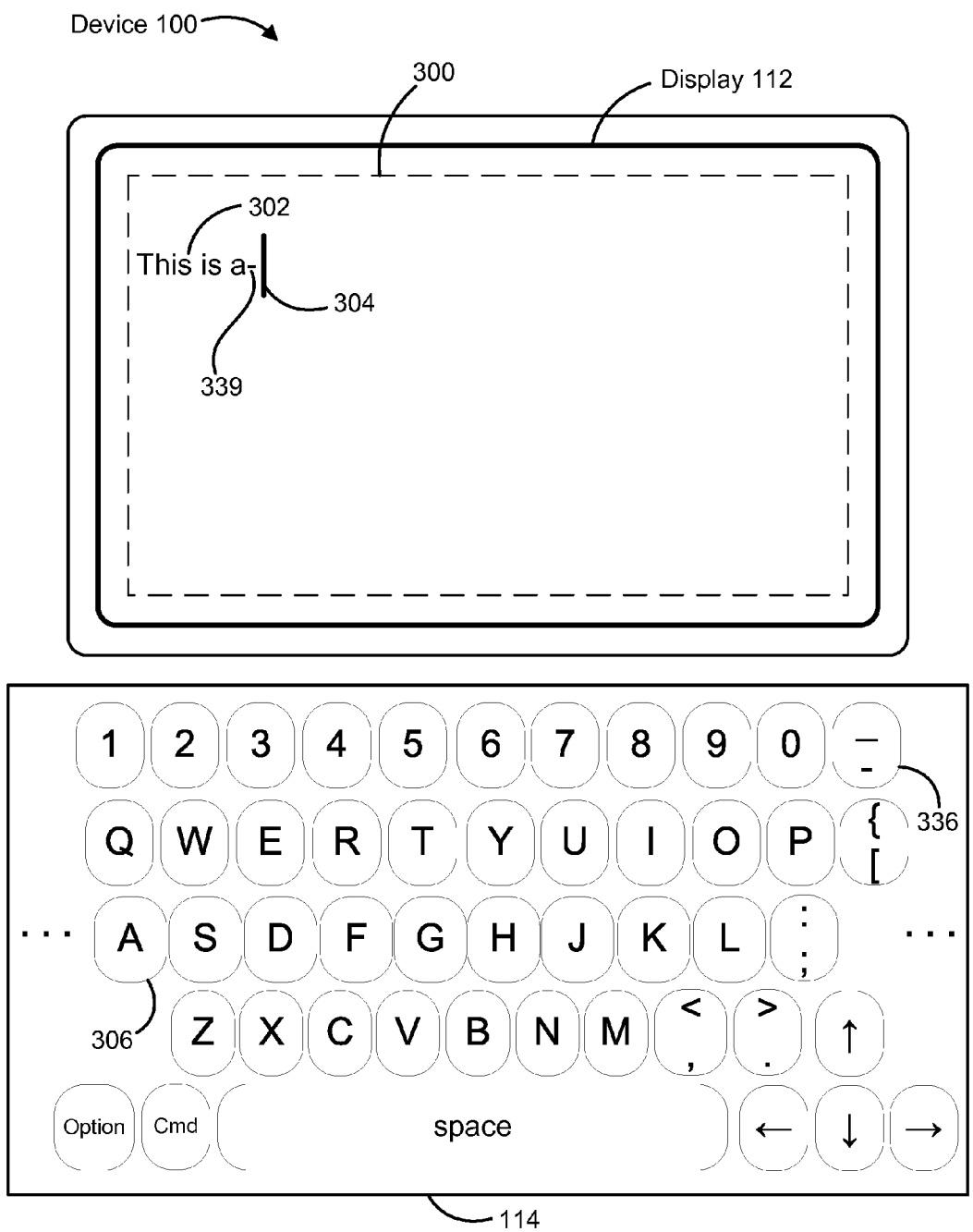
Figure 3N:
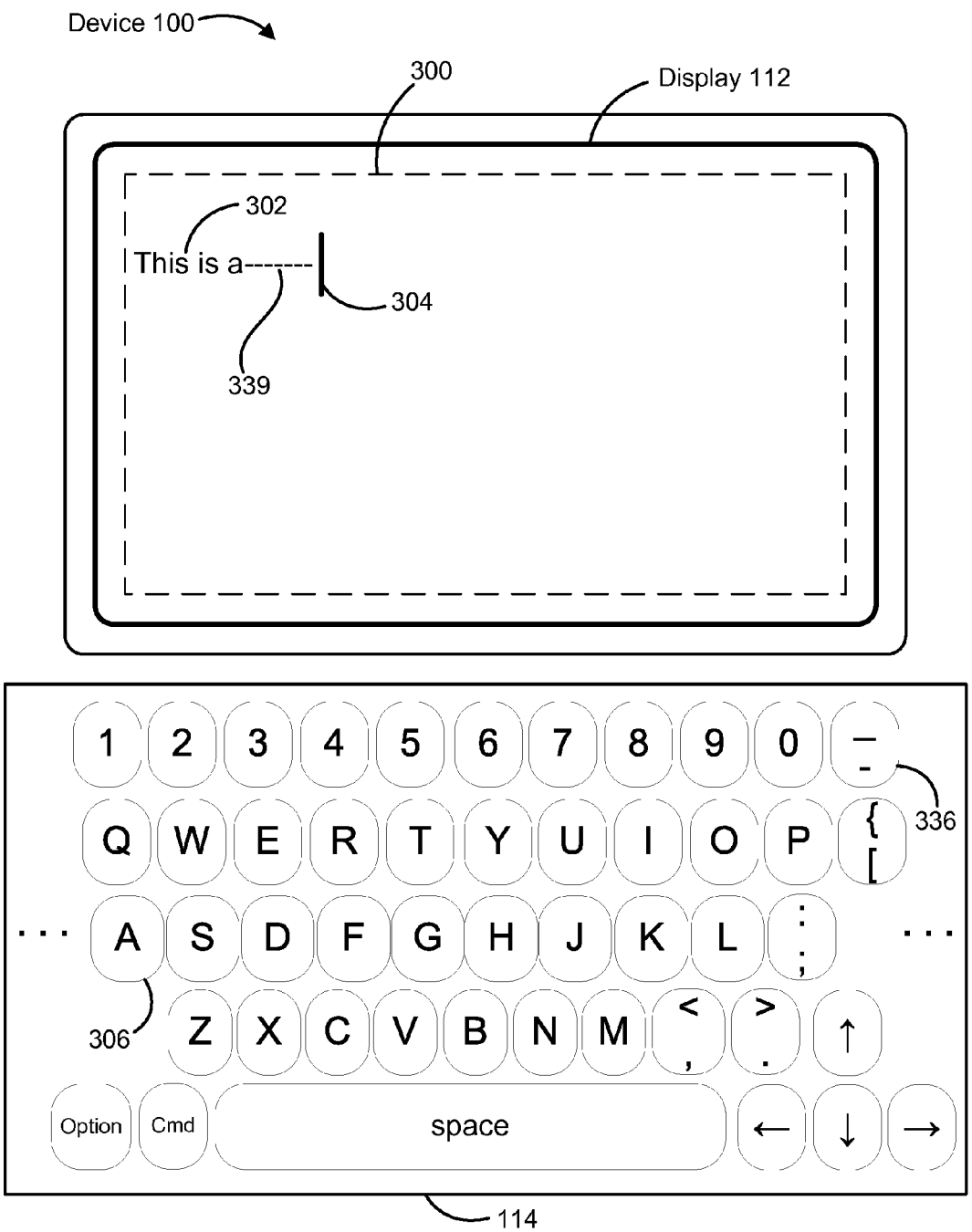

The action taken by device 100 in response to detection of activation 338 of key 336 depends on the duration of activation 338. If activation 338 is determined to last less than a second predefined time period (e.g., 0.2, 0.3, 0.4, 0.5 seconds or any reasonable time), a single instance of character "-" 339 is entered into input text 302, as shown in FIG. 3M. If activation 338 is determined to last more than the second predefined time period, multiple instances of character "-" 339 are entered into input text 302, as shown in FIG. 3N, until activation 338 of key 336 ceases.

Figure 3O:
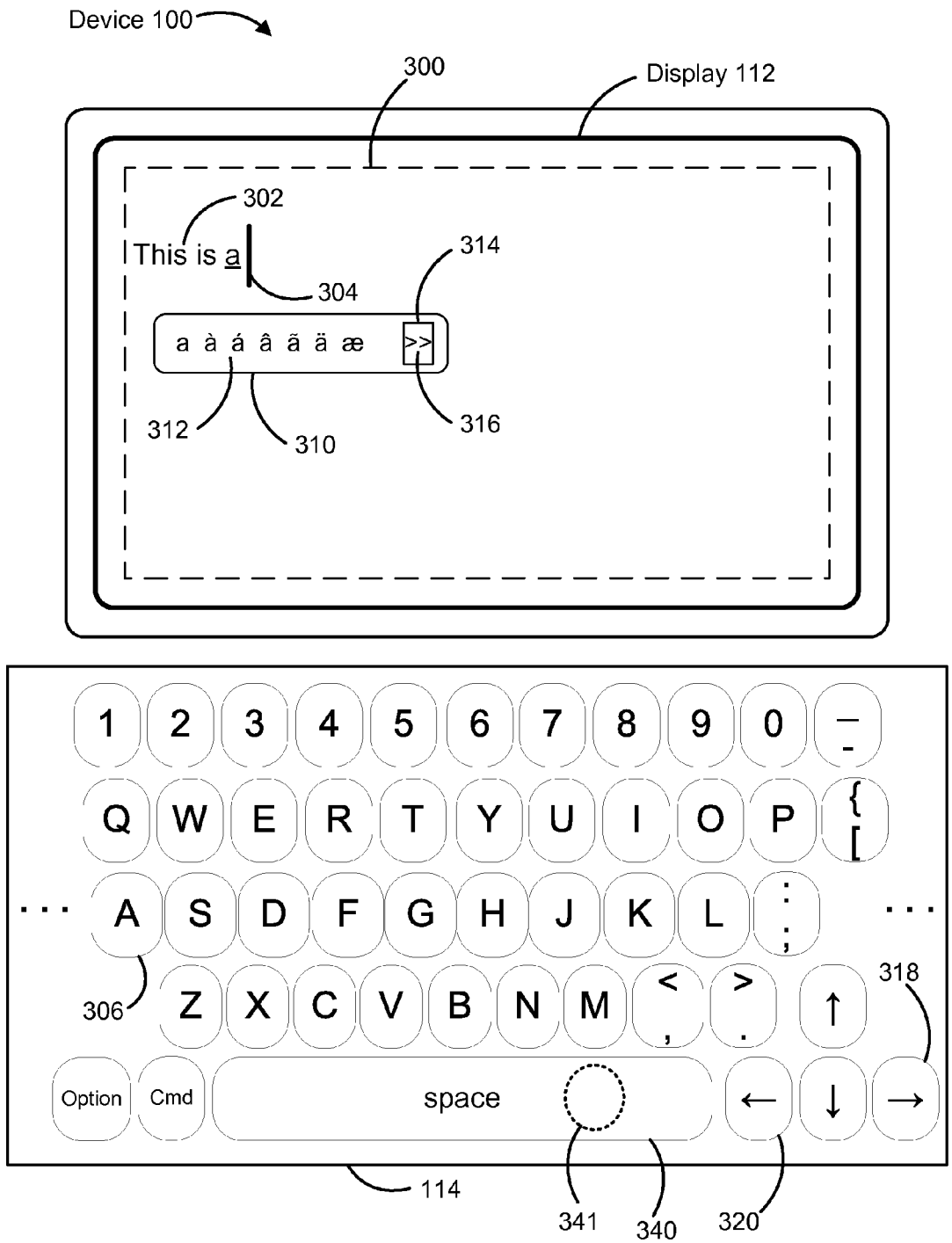
Figure 3P:
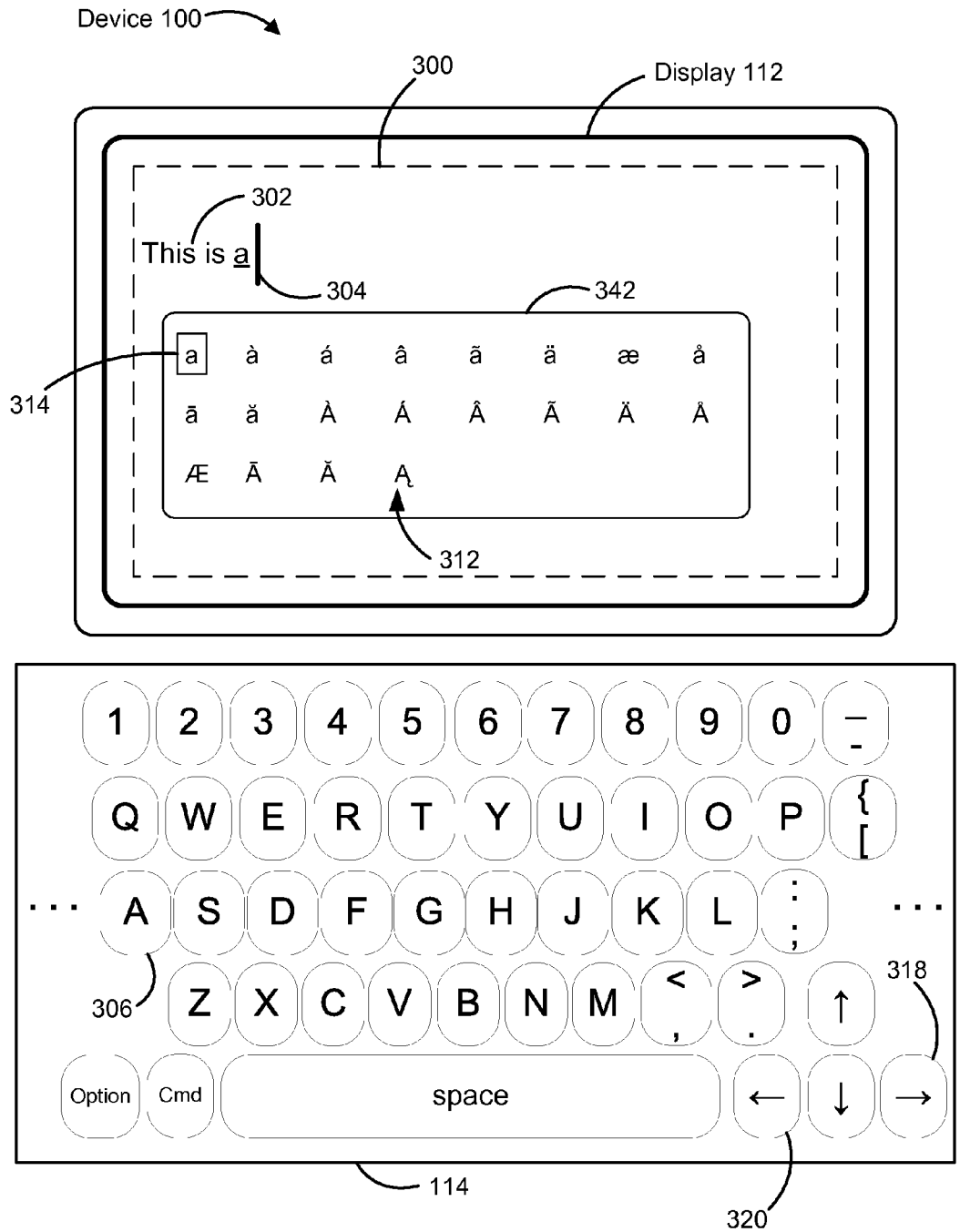
Figure 4A:
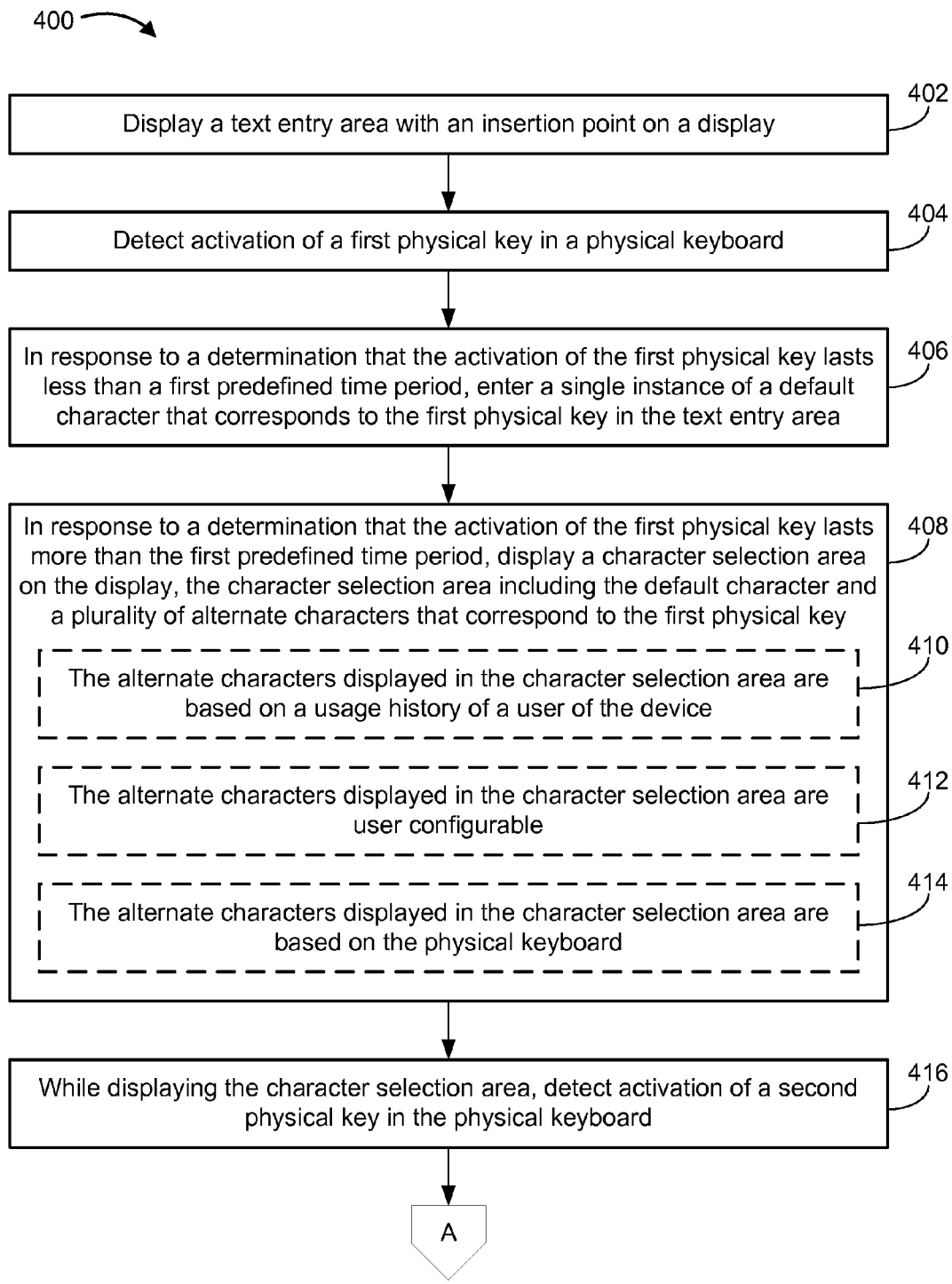
FIGS. 4A-4D are flow diagrams illustrating a method of entering alternate characters using a physical keyboard in accordance with some embodiments.
Figure 4B:
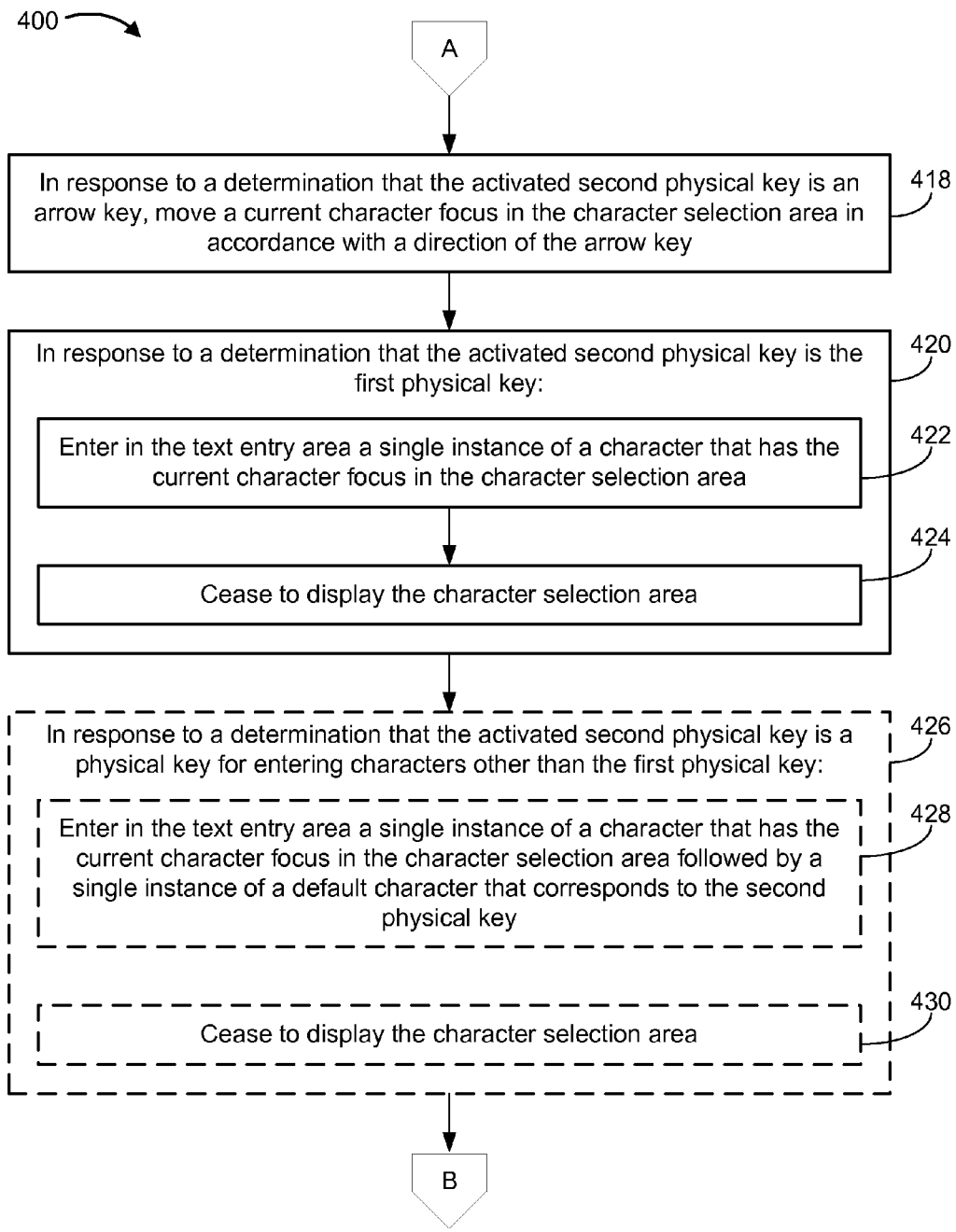
Figure 4C:
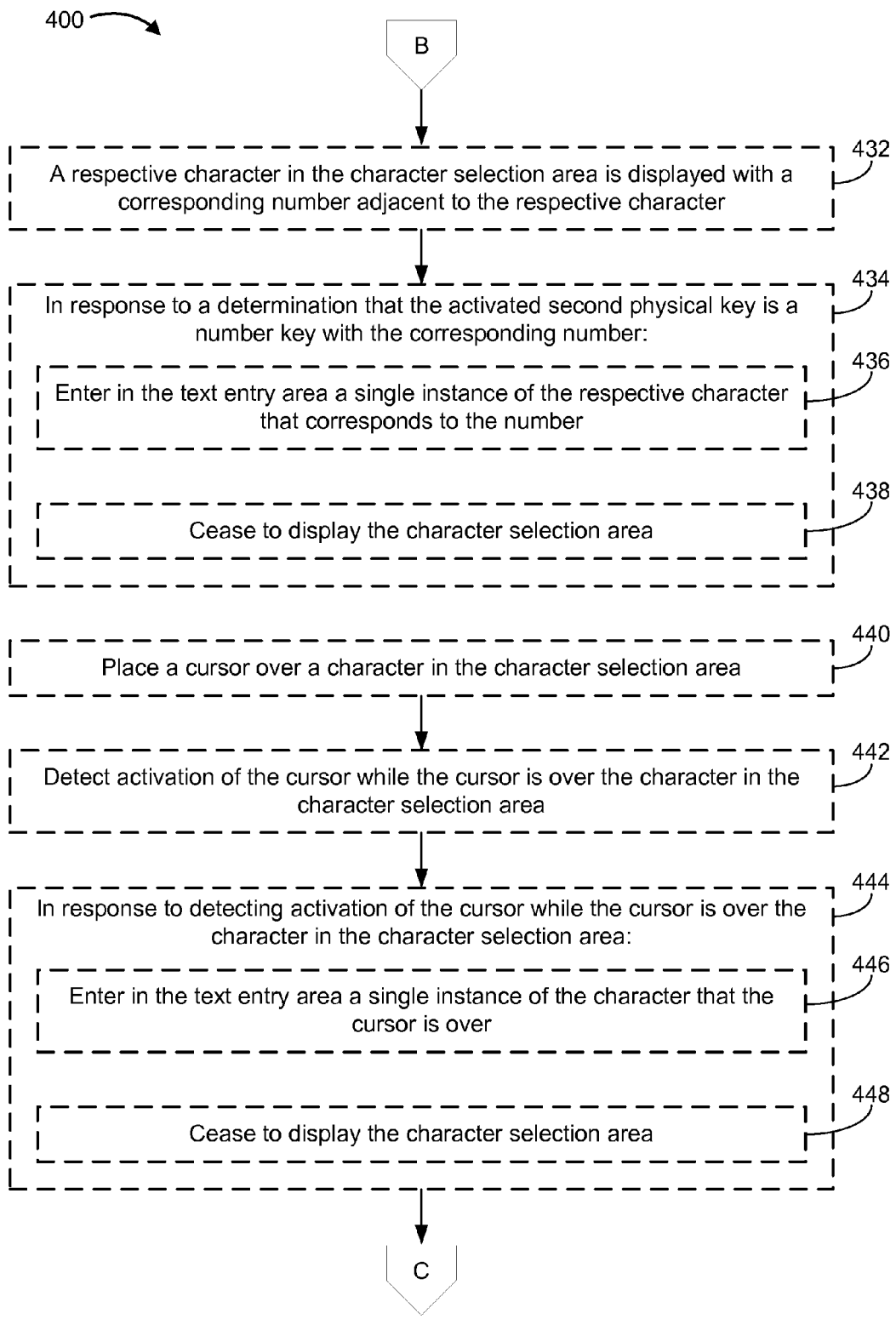
Figure 4D:
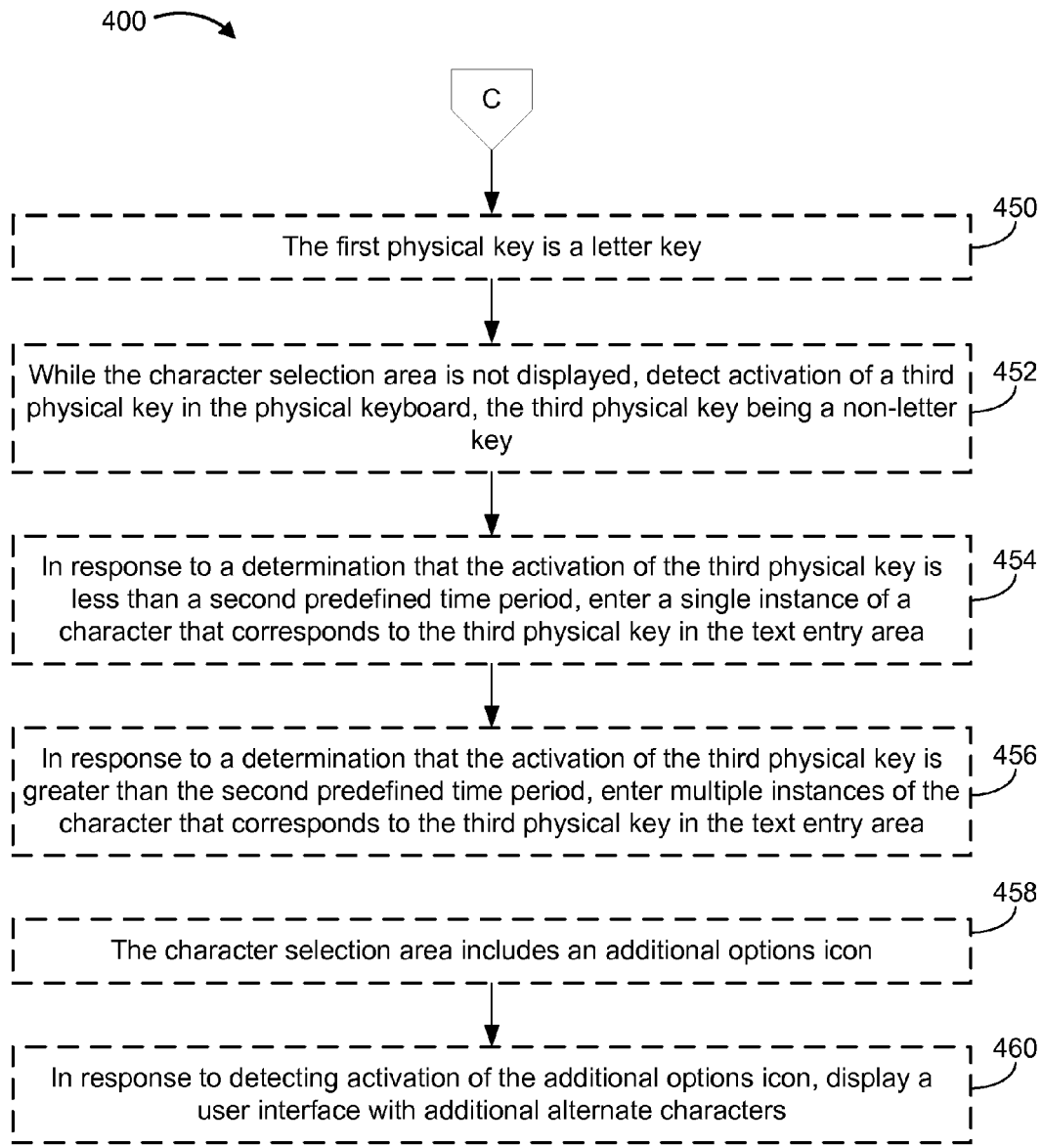

FIG. 3O illustrates additional options icon 316, in character selection area 310, having current character focus 314. As described above with reference to FIG. 3C, current character focus 314 may be moved within character selection area 310 by activating arrow keys 318 or 320. Thus, arrow keys 318 or 320 may be activated one or more times to move current character focus 314 onto additional options icon 316. When additional options icon 316 has the current character focus 314, additional options icon 316 may be activated by activating a key (e.g., space key 340) on physical keyboard 114. For example, FIG. 3O illustrates activation 341 of space key 340. In some embodiments, additional options icon 316 may also be activated by positioning cursor 334 (e.g., using mouse 116 or trackpad 118) over additional options icon 316 and activating cursor 334 when in position.

In response to the activation of additional options icon 316, expanded character selection area 342 is displayed. Expanded character selection area 342 is displayed in text entry area 300 in place of character selection area 310. Expanded character selection area 342 includes a larger set of candidate characters 312; candidate characters 312 displayed in expanded character selection area 342 include the candidate characters that were displayed in character selection area 310 as well as additional candidate characters (e.g., additional alternate characters corresponding to key 306). Entry of a candidate character 312 from expanded character selection area 342 may be achieved by the ways described above (e.g., activating key 306 while the desired candidate character has the current character focus 314, activating cursor 334 while in position, etc.). In some embodiments, expanded character selection area 342 includes characters that do not correspond to key 306, such as symbol characters (e.g., #, %, &, Δ, and/or π) or special characters (e.g., ©, ®, ™, §, and/or ¶).

FIGS. 4A-4D are flow diagrams illustrating a method 400 of entering alternate characters using a physical keyboard in accordance with some embodiments. The method 400 is performed at an electronic device (e.g., device 100, FIG. 1) with a display and a physical keyboard (e.g., a notebook computer or a desktop computer). Some operations in method 400 may be combined and/or the order of some operations may be changed.

As described below, the method 400 provides a faster, more efficient way to enter alternate characters using a physical keyboard. The method reduces the cognitive burden on a user when entering alternate characters using a physical keyboard, thereby creating a more efficient human-machine interface. For battery-operated electronic devices, enabling a user to enter alternate characters using a physical keyboard faster and more efficiently conserves power and increases the time between battery charges.

The device displays a text entry area with an insertion point on a display of the device (402). In FIG. 3A, for example, text entry area 300, with insertion point 304, is displayed on display 112 of device 100.

The device detects activation of a first physical key in a physical keyboard of the device (e.g., detecting depression of the first physical key by a finger pressing down on the first physical key) (404). For example, in FIG. 3A, activation 308 of key 306 in physical keyboard 114 is detected.

In response to a determination that the activation of the first physical key lasts less than a first predefined time period, the device enters a single instance of a default character that corresponds to the first physical key in the text entry area (e.g., at the insertion point in the text entry area) (406). For example, in FIGS. 3A-3B, if the duration of activation 308 is less than a predefined amount of time (i.e., if device 100 determines that activation 308 lasts less than the predefined amount of time), a single instance of character "a" 305, which is the default character corresponding to key 306, is entered into input text 302 at the position indicated by insertion point 304.

In response to a determination that the activation of the first physical key lasts more than the first predefined time period, the device displays a character selection area on the display (408). The character selection area includes the default character and a plurality of alternate characters that correspond to the first physical key. The device displays the character selection area without entering a character in the text entry area.

For example, in FIGS. 3A and 3C, if the duration of activation 308 is more than a predefined amount of time (i.e., if device 100 determines that activation 308 lasts more than the predefined amount of time), character selection area 310 is displayed. Character selection area 310 includes, as candidate characters 312, the default character "a," corresponding to key 306, and multiple alternates characters that are variants of "a" and which also correspond to key 306.

In some embodiments, the character selection area 310 is displayed next to the insertion point, which reduces the eye movement by the user needed to read the characters in the character selection area.

In some embodiments, the alternate characters displayed in the character selection area are based on a usage history of a user of the device (410). For example, within character selection area 312, the alternate characters among the candidate characters 312 may be selected for display by device 100 based on their frequency of usage by the user of device 100.

In some embodiments, the alternate characters displayed in the character selection area are user configurable (412). For example, the user may configure the language or keyboard mapping for physical keyboard 114. The alternate characters that are displayed as candidate characters 312 may be based on the language or keyboard mapping setting.

In some embodiments, the alternate characters displayed in the character selection area are based on the physical keyboard (414). For example, different physical keyboards are associated with different languages or keyboard mappings by default (e.g., a Russian keyboard, an English keyboard (e.g., a QWERTY keyboard), etc.). The alternate characters that are displayed as candidate characters 312 may be based on the language or keyboard mapping associated with the physical keyboard 114 in use. The alternate characters corresponding to the keys of a physical keyboard may be fixed by the type of physical keyboard or may be user configurable.

While displaying the character selection area, the device detects activation of a second physical key in the physical keyboard (416). For example, in FIG. 3C, while character selection area 310 is displayed, activation 322 of key 318 is detected (in which case the second physical key is different from the first physical key). As another example, in FIG. 3D, activation 324 of key 306 is detected (in which case the second physical key is the same as the first physical key).

In response to a determination that the activated second physical key is an arrow key, the device moves a current character focus in the character selection area in accordance with a direction of the arrow key (418). For example, in FIG. 3C, right arrow key 318 is activated 322. In response to a determination that the activated key is the right arrow key 318, current character focus 314 is moved from the character "a" (FIG. 3C) to the character "à" within character selection area 310 (FIG. 3D).

In response to a determination that the activated second physical key is the first physical key (420), the device enters in the text entry area (e.g., at the insertion point in the text entry area) a single instance of a character that has the current character focus in the character selection area (422), and ceases to display the character selection area (424). For example, in FIG. 3D, key 306 is activated 324 a second time, subsequent to activation 308 (FIG. 3A). In response to a determination that activation 324 activated key 306, the character "à" 317, which has the current character focus 314 in FIG. 3D, is entered into input text 302 in FIG. 3E. Also, in response to the determination that the activated second physical key is the first physical key, character selection 310 ceases to be displayed in FIG. 3E.

In some embodiments, in response to a determination that the activated second physical key is a physical key for entering characters other than the first physical key (426), the device enters in the text entry area (e.g., at the insertion point in the text entry area) a single instance of a character that has the current character focus in the character selection area followed by a single instance of a default character that corresponds to the second physical key (428), and ceases to display the character selection area (430). For example, in FIG. 3F, which follows from FIG. 3C, key 326 is activated 327. Key 326, a different key from key 306, corresponds to the character "c." In FIG. 3G, in response to the activation 327 of key 326, a character "a," which had the current character focus 314 in FIG. 3F, and a character "c" are entered into input text 302. Also, character selection area 310 ceases to be displayed, as shown in FIG. 3G.

In some embodiments, a respective character in the character selection area is displayed with a corresponding number adjacent to the respective character (432). For example, in FIG. 3H, each candidate character 312 in character selection area 310 is displayed with a respective corresponding number 328 adjacent to the character.

In response to a determination that the activated second physical key is a number key with the corresponding number (434), the device enters in the text entry area (e.g., at the insertion point in the text entry area) a single instance of the respective character that corresponds to the number (436), and ceases to display the character selection area (438). For example, in FIG. 3H, numbers 1-7 correspond to default character "a" and alternate characters "à," "á," "â," "ã," "ä," and "æ," respectively. In response to activation of the "1" key, the default character "a" is entered. In response to activation of the "2" key, the alternate character "à," is entered. In response to activation of the "3" key, the alternate character "á," is entered. And so on. In FIG. 3H, for example, key 330, corresponding to the number "6," is activated 332. In character selection area 310, the number "6" corresponds to the alternate character "ä." In response to a determination that key 330 is activated, the character "ä" is entered into input text 302 and character selection area 310 ceases to be displayed, as shown in FIG. 3I.

In some embodiments, the device places a cursor over a character in the character selection area (440) and detects activation of the cursor while the cursor is over the character in the character selection area (e.g., detecting a mouse click or touch pad click while the cursor is over the character) (442). The cursor may be placed over the character in response to user input (e.g., the user positioning the cursor using a mouse or touchpad).

In response to detecting activation of the cursor while the cursor is over the character in the character selection area (444), the device enters in the text entry area (e.g., at the insertion point in the text entry area) a single instance of the character that the cursor is over (446), and ceases to display the character selection area (448). For example, in FIGS. 3J-3K, in response to detecting activation of cursor 334 while cursor 334 is positioned over the character "ä" in character selection area 310, the character "ä" is entered into input text 302 and character selection area 310 ceases to be displayed.

In some embodiments, the first physical key is a letter key (450), and while the character selection area is not displayed, the device detects activation of a third physical key in the physical keyboard, the third physical key being a non-letter key (e.g., a punctuation key or a symbol key) (452). For example, the originally activated key 306 is a letter key (corresponding to "a"), and in FIG. 3L, activated 338 of non-letter key 336 (corresponding to "-") is detected.

In response to a determination that the activation of the third physical key is less than a second predefined time period, the device enters a single instance of a character that corresponds to the third physical key in the text entry area (e.g., at the insertion point in the text entry area) (454). For example, in response to a determination that that the duration of activation 338 of key 336 is less than the second predefined time period, a single instance of "-" is entered into input text 302, as shown in FIG. 3M. In some embodiments, the second predefined time period is the same as the first predefined time period. In some embodiments, the second predefined time period is longer than the first predefined time period. In some embodiments, the second predefined time period is shorter than the first predefined time period.

In response to a determination that the activation of the third physical key is greater than the second predefined time period, the device enters multiple instances of the character that corresponds to the third physical key in the text entry area (e.g., at the insertion point in the text entry area) (456). For example, if a user holds down the period key for more than a predefined time (e.g., 0.2, 0.3, 0.4, 0.5 seconds or any reasonable time) then multiple periods (".") will be entered until activation of the period key ceases. Thus, in some embodiments, activating a letter key for more than a predefined time results in display of a character selection area for that letter key, whereas activating a non-letter key for more than a predefined time results in repeated entry of the character that corresponds to the non-letter key. For example, in response to a determination that the duration of activation 338 of key 336 is more than the second predefined time period, multiple instance of "-" is entered into input text 302, as shown in FIG. 3N.

In some embodiments, the character selection area includes an additional options icon (458), and in response to detecting activation of the additional options icon (e.g., by detecting a mouse click or touch pad click while the cursor is over the additional options icon or by detecting activation of a physical key while the current character focus is on the additional options icon), the device displays a user interface with additional alternate characters (460). For example, in FIG. 3O, character selection area 310 includes additional options icon 316. In response to the detection of activation 341 of key 340 while additional options icon 316 has the current character focus 314, expanded character selection area 342, with additional candidate characters 312 (e.g., more alternate characters), is displayed, as shown in FIG. 3P.

Figure 5:
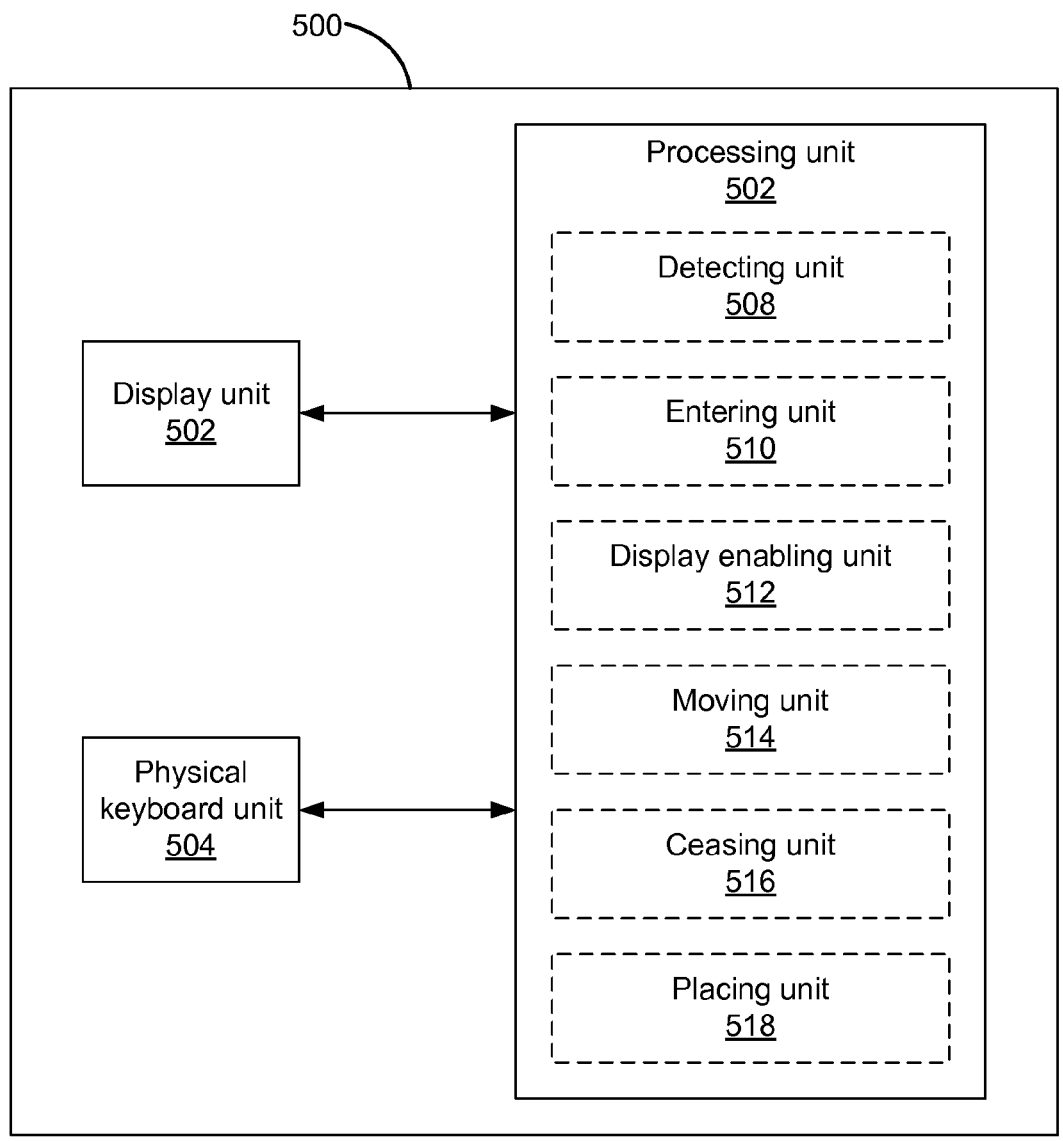
FIG. 5 is a functional block diagram of an electronic device in accordance with some embodiments.

In accordance with some embodiments, FIG. 5 shows a functional block diagram of an electronic device 500 configured in accordance with the principles of the invention as described above. The functional blocks of the device may be implemented by hardware, software, or a combination of hardware and software to carry out the principles of the invention. It is understood by persons of skill in the art that the functional blocks described in FIG. 5 may be combined or separated into sub-blocks to implement the principles of the invention as described above. Therefore, the description herein may support any possible combination or separation or further definition of the functional blocks described herein.

As shown in FIG. 5, an electronic device 500 includes a display unit 502 configured to display a text entry area with an insertion point, a physical keyboard unit 504 configured to receive activations of physical keys in the physical keyboard unit 504, and a processing unit 506 coupled to the display unit 502 and the physical keyboard unit 504. In some embodiments, the processing unit 506 includes a detecting unit 508, an entering unit 510, a display enabling unit 512, a moving unit 514, a ceasing unit 516, and a placing unit 518.

The processing unit 506 is configured to: detect activation of a first physical key in the physical keyboard unit (e.g., with the detecting unit 508); in response to a determination that the activation of the first physical key lasts less than a first predefined time period, enter a single instance of a default character that corresponds to the first physical key in the text entry area (e.g., with the entering unit 510); in response to a determination that the activation of the first physical key lasts more than the first predefined time period, enable display of a character selection area on the display unit (e.g., with the display enabling unit 512), the character selection area including the default character and a plurality of alternate characters that correspond to the first physical key; while displaying the character selection area, detect activation of a second physical key in the physical keyboard unit (e.g., with the detecting unit 508); in response to a determination that the activated second physical key is an arrow key, move a current character focus in the character selection area in accordance with a direction of the arrow key (e.g., with the moving unit 514); and in response to a determination that the activated second physical key is the first physical key: enter in the text entry area a single instance of a character that has the current character focus in the character selection area (e.g., with the entering unit 510), and cease to display the character selection area (e.g., with the ceasing unit 516).

In some embodiments, the alternate characters displayed in the character selection area are based on a usage history of a user of the device.

In some embodiments, the alternate characters displayed in the character selection area are user configurable.

In some embodiments, the alternate characters displayed in the character selection area are based on the physical keyboard.

In some embodiments, the processing unit 506 is configured to, in response to a determination that the activated second physical key is a physical key for entering characters other than the first physical key: enter in the text entry area a single instance of a character that has the current character focus in the character selection area followed by a single instance of a default character that corresponds to the second physical key (e.g., with the entering unit 510), and cease to display the character selection area (e.g., with the ceasing unit 516).

In some embodiments, a respective character in the character selection area is displayed with a corresponding number adjacent to the respective character, and the processing unit 506 is configured to, in response to a determination that the activated second physical key is a number key with the corresponding number: enter in the text entry area a single instance of the respective character that corresponds to the number (e.g., with the entering unit 510), and cease to display the character selection area (e.g., with the ceasing unit 516).

In some embodiments, the processing unit 506 is configured to: place a cursor over a character in the character selection area (e.g., with the placing unit 518); detect activation of the cursor while the cursor is over the character in the character selection area (e.g., with the detecting unit 508); and, in response to detecting activation of the cursor while the cursor is over the character in the character selection area: enter in the text entry area a single instance of the character that the cursor is over (e.g., with the entering unit 510), and cease to display the character selection area (e.g., with the ceasing unit 516).

In some embodiments, the first physical key is a letter key, and the processing unit 506 is configured to, while the character selection area is not displayed, detect activation of a third physical key in the physical keyboard unit, the third physical key being a non-letter key (e.g., with the detecting unit 508); in response to a determination that the activation of the third physical key is less than a second predefined time period, enter a single instance of a character that corresponds to the third physical key in the text entry area (e.g., with the entering unit 510); and in response to a determination that the activation of the third physical key is greater than the second predefined time period, enter multiple instances of the character that corresponds to the third physical key in the text entry area (e.g., with the entering unit 510).

In some embodiments, the character selection area includes an additional options icon, and the processing unit 506 is configured to, in response to detecting activation of the additional options icon, enable display of a user interface with additional alternate characters (e.g., with the display enabling unit 512).

In some embodiments, non-letter alternate characters may be entered in an analogous manner as alternate letter characters are entered as described above. For example, activating the key corresponding to the dollar sign for longer than a predefined time period may activate display of a character selection area where the candidate characters are the dollar sign and symbols corresponding to other currencies. As further examples, quotation marks from different languages and emoji characters may also be entered in an analogous manner.

In some embodiments, movement of the current character focus in the character selection area is achieved by activating the originally activated character key repeatedly, rather than or in addition to activating the arrow keys. For example, in FIG. 3C, key 306 may be activated repeatedly to cycle through candidate characters 312. To enter a desired candidate character, the user activates a character key other than key 306 (e.g., the space bar, a different letter key, a punctuation key).

As described above, when the first physical key is activated and the activation lasts longer than the first predefined time period, a character selection area is displayed. In some embodiments, the user may configure the action taken, when the activation lasts longer than the first predefined time period, to be entry of multiple instances of the corresponding character instead of displaying the character selection area. In other words, the user may configure to device to, when the activation lasts more than a predefined time period, to display the character selection area or to enter the character repeatedly.

The operations in the information processing methods described above may be implemented by running one or more functional modules in information processing apparatus such as general purpose processors or application specific chips. These modules, combinations of these modules, and/or their combination with general hardware (e.g., as described above with respect to FIG. 1) are all included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An electronic device, comprising:
   a display;
   a keyboard;
   one or more processors;
   a memory; and
   one or more programs, wherein the one or more programs are stored in the memory and are configured to be executed by the one or more processors, the one or more programs including instructions for:
   displaying a text entry area with an insertion point on the display;
   detecting activation of a first key on the keyboard;
   in response to a determination that the activation of the first key lasts less than a first predefined time period, entering a single instance of a default character that corresponds to the first key in the text entry area;
   in response to a determination that the activation of the first key lasts more than the first predefined time period, displaying a character selection area on the display, the character selection area including the default character and a plurality of alternate characters that correspond to the first key;
   while displaying the character selection area, detecting activation of a second key on the keyboard;
   in response to a determination that the activated second key is a key for navigation, moving a current character focus in the character selection area in accordance with a direction of the key for navigation; and
   in response to a determination that the activated second key is the first key, entering in the text entry area a single instance of a character that has the current character focus in the character selection area, and ceasing to display the character selection area.

2. The device of claim 1, wherein the alternate characters displayed in the character selection area are based on a usage history of a user of the device.

3. The device of claim 1, wherein the alternate characters displayed in the character selection area are user configurable.

4. The device of claim 1, wherein the alternate characters displayed in the character selection area are based on the keyboard.

5. The device of claim 1, including instructions for:
   in response to a determination that the activated second key is a key for entering characters other than the first key, entering in the text entry area a single instance of a character that has the current character focus in the character selection area followed by a single instance of a default character that corresponds to the second key, and ceasing to display the character selection area.

6. The device of claim 1, wherein a respective character in the character selection area is displayed with a corresponding number adjacent to the respective character, the device including instructions for:
   in response to a determination that the activated second key is a number key with the corresponding number, entering in the text entry area a single instance of the respective character that corresponds to the number, and ceasing to display the character selection area.

7. The device of claim 1, including instructions for:
   placing a cursor over a character in the character selection area;
   detecting activation of the cursor while the cursor is over the character in the character selection area; and,
   in response to detecting activation of the cursor while the cursor is over the character in the character selection area, entering in the text entry area a single instance of the character that the cursor is over, and ceasing to display the character selection area.

8. The device of claim 1, wherein the first key is a letter key, the device including instructions for:
   while the character selection area is not displayed, detecting activation of a third key on the keyboard, the third key being a non-letter key;
   in response to a determination that the activation of the third key is less than a second predefined time period, entering a single instance of a character that corresponds to the third key in the text entry area; and
   in response to a determination that the activation of the third key is greater than the second predefined time period, entering multiple instances of the character that corresponds to the third key in the text entry area.

9. The device of claim 1, wherein the character selection area includes an additional options icon, the device including instructions for: in response to detecting activation of the additional options icon, displaying a user interface with additional alternate characters.

10. The device of claim 1, wherein the keyboard is a keyboard.

11. A method, comprising:
    at an electronic device with a display and a keyboard:
    displaying a text entry area with an insertion point on the display;
    detecting activation of a first key in the keyboard;
    in response to a determination that the activation of the first key lasts less than a first predefined time period, entering a single instance of a default character that corresponds to the first key in the text entry area;
    in response to a determination that the activation of the first key lasts more than the first predefined time period, displaying a character selection area on the display, the character selection area including the default character and a plurality of alternate characters that correspond to the first key;
    while displaying the character selection area, detecting activation of a second key in the keyboard;
    in response to a determination that the activated second key is an arrow key, moving a current character focus in the character selection area in accordance with a direction of the arrow key; and
    in response to a determination that the activated second key is the first key, entering in the text entry area a single instance of a character that has the current character focus in the character selection area, and ceasing to display the character selection area.

12. The method of claim 11, wherein the plurality of alternate characters are based on a usage history.

13. The method of claim 11, wherein the plurality of alternate characters are selectable based on received input.

14. The method of claim 11, wherein the plurality of alternate characters displayed are based on the keyboard.

15. A non-transitory computer readable storage medium storing one or more programs, the one or more programs comprising instructions, which when executed by an electronic device with a display and a keyboard, cause the device to:
    display a text entry area with an insertion point on the display;
    detect activation of a first key in the keyboard;
    in response to a determination that the activation of the first key lasts less than a first predefined time period, enter a single instance of a default character that corresponds to the first key in the text entry area;

in response to a determination that the activation of the first key lasts more than the first predefined time period, display a character selection area on the display, the character selection area including the default character and a plurality of alternate characters that correspond to the first key;

while displaying the character selection area, detect activation of a second key in the keyboard;

in response to a determination that the activated second key is an arrow key, move a current character focus in the character selection area in accordance with a direction of the arrow key; and in response to a determination that the activated second key is the first key, enter in the text entry area a single instance of a character that has the current character focus in the character selection area, and cease to display the character selection area.

16. A graphical user interface on an electronic device with a display, a keyboard, a memory, and one or more processors to execute one or more programs stored in the memory, the graphical user interface comprising:

a text entry area with an insertion point;

wherein: in response to a determination that an activation of a first key in the keyboard lasts less than a first predefined time period, a single instance of a default character that corresponds to the first key is entered in the text entry area;

in response to a determination that the activation of the first key lasts more than the first predefined time period, a character selection area is displayed on the display, the character selection area including the default character and a plurality of alternate characters that correspond to the first key;

while displaying the character selection area, activation of a second key in the keyboard is detected;

in response to a determination that a second key in the keyboard, activated while the character selection area is displayed, is an arrow key, a current character focus in the character selection area is moved in accordance with a direction of the arrow key; and in response to a determination that the activated second key is the first key, a single instance of a character that has the current character focus in the character selection area is entered in the text entry area, and the character selection area ceases to be displayed.

17. The graphical user interface of claim 16, wherein the plurality of alternate characters are based on a usage history.

18. The graphical user interface of claim 16, wherein the plurality of alternate characters are configurable.

19. The graphical user interface of claim 16, wherein the plurality of alternate characters displayed are based on the keyboard.

20. The graphical user interface of claim 16, wherein the keyboard is a keyboard.

* * * * *

UNITED STATES PATENT AND TRADEMARK OFFICE
CERTIFICATE OF CORRECTION

| | | |
|---|---|---|
| PATENT NO. | : 8,922,490 B2 | Page 1 of 1 |
| APPLICATION NO. | : 13/243733 | |
| DATED | : December 30, 2014 | |
| INVENTOR(S) | : Douglas R. Davidson et al. | |

It is certified that error appears in the above-identified patent and that said Letters Patent is hereby corrected as shown below:

In the Claims

Claim 10, Column 22, line 22 should read as follows:

10. The device of claim 1, wherein the keyboard is a --physical-- keyboard.

Claim 20, Column 24, line 25 should read as follows:

20. The graphical user interface of claim 16, wherein the keyboard is a --physical-- keyboard.

Signed and Sealed this
Fourteenth Day of April, 2015

Michelle K. Lee
*Director of the United States Patent and Trademark Office*